US012579940B2

(12) United States Patent
Zhang et al.

(10) Patent No.: US 12,579,940 B2
(45) **Date of Patent: *Mar. 17, 2026**

(54) DISPLAY SUBSTRATE AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Tiaomei Zhang, Beijing (CN); Hong Yi, Beijing (CN); Quanyong Gu, Beijing (CN); De Li, Beijing (CN); Zhengkun Li, Beijing (CN); Guo Liu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/011,035

(22) Filed: Jan. 6, 2025

(65) Prior Publication Data

US 2025/0140196 A1 May 1, 2025

Related U.S. Application Data

(63) Continuation of application No. 18/014,732, filed as application No. PCT/CN2022/070990 on Jan. 10, 2022, now Pat. No. 12,211,441.

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/08* (2013.01)

(58) Field of Classification Search
CPC ................................................ H10K 59/00–95
See application file for complete search history.

(56) References Cited

U.S. PATENT DOCUMENTS

2021/0193780 A1* 6/2021 Diao .................. H10K 59/1201
2021/0335989 A1* 10/2021 Diao .................... H10K 59/126
2021/0358420 A1* 11/2021 Yang .................... H10K 59/121

* cited by examiner

*Primary Examiner* — Sanjiv D. Patel
(74) *Attorney, Agent, or Firm* — BROOKS KUSHMAN P.C.

(57) ABSTRACT

A display substrate includes: a base substrate and a plurality of sub-pixels arranged on the base substrate, the sub-pixel include a sub-pixel driving circuit, the sub-pixel driving circuit includes: a first transistor, a driving transistor, and a first conductive connection portion; a first electrode of the first transistor is coupled to a second electrode of the driving transistor, a second electrode of the first transistor and a first end portion of the first conductive connection portion are arranged at different layers, the second electrode of the first transistor and the first end portion of the first conductive connection portion are coupled through a via hole; a second end portion of the first conductive connection portion is coupled to a gate electrode of the driving transistor.

17 Claims, 14 Drawing Sheets

DISPLAY SUBSTRATE AND DISPLAY DEVICE

CROSS-REFERENCE TO RELATED APPLICATIONS

This application is a continuation of U.S. patent application Ser. No. 18/014,732 filed on Jan. 5, 2023, which is the U.S. national phase of PCT Application No. PCT/CN2022/070990 filed on Jan. 10, 2022, which are incorporated herein by reference in their entireties.

TECHNICAL FIELD

The present disclosure relates to the field of display technology, in particular to a display substrate and a display device.

BACKGROUND

Organic Light-Emitting Diode (OLED) displays are widely used in various fields with the advantages of light, high brightness, low power consumption, fast response, high definition, good flexibility, and high light-emitting efficiency.

As consumers continue to improve the requirements of display quality, the display gradually develops in the direction of high pixel density. In the same size range, the higher the pixel density of the monitor is, the higher the definition of the picture is, the better the display effect is.

SUMMARY

An object of the present disclosure is to provide a display substrate and a display device.

In order to achieve the above-mentioned object, the present disclosure provides the following technical solutions.

In one aspect, the present disclosure provides in some embodiments a display substrate, including: a base substrate and a plurality of sub-pixels arranged on the base substrate, the display substrate also includes a data line; the sub-pixel include a sub-pixel driving circuit, the sub-pixel driving circuit includes: a first transistor, a fourth transistor, a driving transistor, and a first conductive connection portion; a first electrode of the first transistor is coupled to a second electrode of the driving transistor, the second electrode of the first transistor and a first end portion of the first conductive connection portion are arranged at different layers, a second electrode of the first transistor and the first end portion of the first conductive connection portion are coupled through a via hole; a second end portion of the first conductive connection portion is coupled to a gate electrode of the driving transistor; a first electrode of the fourth transistor is coupled to a corresponding data line, a second electrode of the fourth transistor is coupled to a first electrode of the driving transistor; at least part of an orthographic projection of the gate electrode of the first transistor on the base substrate is located between an orthographic projection of the first end portion on the base substrate and an orthographic projection of the gate electrode of the driving transistor on the base substrate.

Optionally, the first conductive connection portion includes at least a part extending along the first direction; the second electrode of the first transistor includes a first portion, a second portion and a third portion coupled sequentially, each of the first portion and the third portion includes at least a part extending along the second direction, the second portion includes at least a part extending along the first direction that intersects the second direction; the third portion is coupled to the first end portion.

Optionally, the first transistor includes a first active layer, and the first active layer includes a first channel portion, the orthographic projection of the first conductive connection portion on the base substrate overlaps the orthographic projection of the first channel portion on the base substrate.

Optionally, the display substrate further includes an initialization signal line; the sub-pixel driving circuit further includes a second transistor, and the first electrode of the second transistor is coupled to the initialization signal line, and the second electrode of the second transistor is coupled to the first end portion; an orthographic projection of the first end portion on the base substrate is located between the orthographic projection of the first electrode of the second transistor on the base substrate and the orthographic projection of the gate electrode of the first transistor on the base substrate.

Optionally, the second electrode of the second transistor includes a fourth portion extending along the first direction; the fourth portion and the second portion are at least partially staggered along the second direction.

Optionally, the sub-pixel driving circuit further includes a second conductive connection portion; the first electrode of the second transistor is coupled to the initialization signal line through the second conductive connection portion; the second transistor includes a second active layer, the second active layer includes a second channel portion, the orthographic projection of the second channel portion on the base substrate at least partially overlaps the orthographic projection of the second conductive connection portion on the base substrate.

Optionally, the sub-pixel further includes: a shielding pattern, wherein an orthographic projection of the shielding pattern on the base substrate at least partially overlaps the orthographic projection of the second electrode of the first transistor on the base substrate, and also at least partially overlaps with the orthographic projection of the second electrodes of the second transistor on the base substrate.

Optionally, the orthographic projection of the shielding pattern on the base substrate covers the orthographic projection of the second portion on the base substrate; the orthographic projection of the shielding pattern on the base substrate at least partially overlaps the orthographic projection of the first portion on the base substrate, and at least partially overlaps the orthographic projection of the third portion on the base substrate.

Optionally, the display substrate further includes a power line; the orthographic projection of the power line on the base substrate at least partially overlaps the orthographic projection of the second electrode of the first transistor on the base substrate; the orthographic projection of the power line on the base substrate at least partially overlaps the orthographic projection of the second electrode of the second transistor on the base substrate.

Optionally, there is a first overlapping area between the orthographic projection of the shielding pattern on the base substrate and the orthographic projection of the power line on the base substrate, the shielding pattern is coupled to the power line through a first via hole in the first overlapping area; an orthographic projection of the first via hole on the base substrate is located between orthographic projections of gate electrode of first transistors in adjacent sub-pixel driving circuits along the second direction on the base substrate.

Optionally, the first transistor includes a first active layer, and the first active layer includes two first channel portions, and a conductor portion coupled to the two first channel portions respectively; an orthographic projection of the shielding pattern on the base substrate at least partially overlaps the orthographic projection of the conductor portion in the adjacent sub-pixel driving circuit on the base substrate.

Optionally, the shielding pattern includes a first shielding portion and a second shielding portion, and the first shielding portion includes at least part extending along the first direction, the second shielding portion includes at least part extending along the second direction; an orthographic projection of the first shielding portion on the base substrate at least partially overlaps the orthographic projection of the second electrode of the first transistor on the base substrate, and also at least partially overlaps the orthographic projection of the second electrode of the second transistor on the base substrate; the orthographic projection of the second shielding portion on the base substrate at least partially overlaps the orthographic projections of the conductor portion in the adjacent sub-pixel driving circuit on the base substrate.

Optionally, at least part of the orthographic projection of the first shielding portion 301 on the base substrate is located between the orthographic projection of the first end portion on the base substrate and the orthographic projections of the first electrode of the fourth transistor on the base substrate.

Optionally, at least part of the first electrode of the fourth transistor and the first end portion are arranged along the second direction.

Optionally, at least part of the power line extends along the first direction; the power line includes a first sub-portion and a second sub-portion, the width of the first sub-portion is smaller than the width of the second sub-portion in a direction vertical to the first direction; at least part of the orthographic projection of the first sub-portion on the base substrate is located between the orthographic projection of the first end portion on the base substrate and the orthographic projection of the first electrode of the fourth transistor on the base substrate.

Optionally, the sub-pixel driving circuit further includes a third conductive connection portion, and the third conductive connection portion is respectively coupled to the first electrode of the fourth transistor and the corresponding data line; the third conductive connection portion and the first sub-portion are arranged along the second direction.

Optionally, the sub-pixel driving circuit further includes a storage capacitor, and the gate electrode of the driving transistor is reused as the first electrode plate of the storage capacitor, the second electrode plate of the storage capacitor is coupled to the power line; the second electrode plate of the storage capacitor and the shielding pattern are arranged at the same layer and made of a same material.

Optionally, the display substrate further includes a plurality of gate lines to provide control signals for the first transistor and the fourth transistor in the sub-pixel; a minimum distance between an overlapping area between the gate line and the first conductive connection portion in a direction perpendicular to the base substrate and an overlapping area between the gate line and the data line in the direction perpendicular to the base substrate is A, and a maximum length of the first conductive connection portion in the extending direction of the data line is B, the ratio of A to B ranges from 0.3 to 0.6.

Optionally, the plurality of sub-pixels are divided into a plurality of pixel units, each pixel unit includes a first sub-pixel, a second sub-pixel and a third sub-pixel; the first sub-pixel includes a first anode pattern, the second sub-pixel includes a second anode pattern, and the third sub-pixel includes a third anode pattern; the first anode pattern and the second anode pattern are located in the same column along the first direction, and the third anode pattern is located in another column.

In a second aspect, an embodiment of the present disclosure provides a display device including the display substrate.

BRIEF DESCRIPTION OF THE DRAWINGS

The drawings described herein are used to provide a further understanding of the present disclosure and constitute a part of the disclosure. The schematic embodiments and their descriptions of the present disclosure are used to explain the present disclosure, and do not constitute an improper limitation of the disclosure.

DETAILED DESCRIPTION

Figure 1:
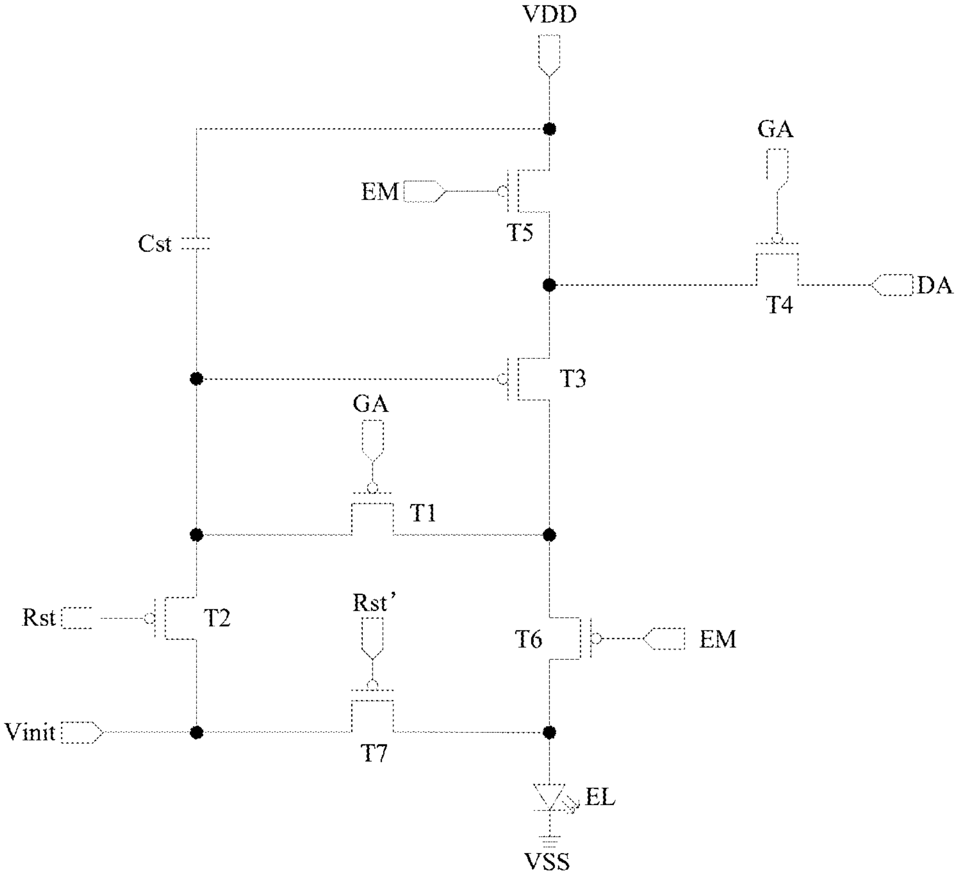
FIG. 1 is a circuit diagram of the sub-pixel driving circuit according to an embodiment of the present disclosure.

In order to further explain the display substrate and display device provided by the embodiments of the present disclosure, the following will be described in detail with reference to the drawings of the disclosure.

In the case of fixed size of the display, the higher the pixel density of the display is, the smaller the layout space occupied by each sub-pixel in the display is, and the more difficult the layout of the corresponding sub-pixel is.

As shown in FIG. 1, FIG. 3, FIG. 5, FIG. 5, FIG. 7, FIG. 10, an embodiment of the present disclosure provides a display substrate, including: a base substrate and a plurality of sub-pixels arranged on the base substrate. The display substrate also includes a data line DA; the sub-pixel include a sub-pixel driving circuit, the sub-pixel driving circuit includes: a first transistor T1, a fourth transistor T4, a driving transistor T3, and a first conductive connection portion 11;

A first electrode of the first transistor T1 is coupled to a second electrode of the driving transistor T3, the second electrode T1-2 of the first transistor T1 and a first end portion 110 of the first conductive connection portion 11 are arranged at different layers, a second electrode T1-2 of the first transistor T1 and the first end portion of the first conductive connection portion 110 are coupled through a via hole; a second end portion of the first conductive connection portion 110 is coupled to a gate electrode T3-G of the driving transistor T3;

A first electrode of the fourth transistor T4 is coupled to a corresponding data line DA, a second electrode of the fourth transistor T4 is coupled to a first electrode of the driving transistor T3;

At least part of an orthographic projection of the gate electrode T1-*g* of the first transistor T1 on the base substrate is located between an orthographic projection of the first end portion 110 on the base substrate and an orthographic projection of the gate electrode T3 of the driving transistor T3 on the base substrate.

Exemplarily, the display substrate includes a plurality of sub-pixels, and the plurality of sub-pixel driving circuits included in the plurality of sub-pixels are arranged in an array. The plurality of sub-pixel driving circuits are divided into a plurality of rows of sub-pixel driving circuits and a plurality of columns of sub-pixel driving circuits. Each row of sub-pixel driving circuits includes a plurality of sub-pixel driving circuits arranged along a second direction. Each column of sub-pixel driving circuits includes a plurality of sub-pixel driving circuits arranged along a first direction. The first direction intersects the second direction. Exemplarily, the first direction includes a longitudinal direction, and the second direction includes a horizontal direction.

Exemplarily, the sub-pixel further includes a light-emitting element EL, and the light-emitting element EL includes an anode, the anode is coupled to a sub-pixel driving circuit in the sub-pixel to which the EL belongs, and receives a driving signal provided by the sub-pixel driving circuit. The light emitting element EL further includes a light emitting functional layer. The display substrate further includes a cathode, the cathode is loaded with a negative power supply signal VSS, and the light-emitting functional layer emits light of a corresponding color under the joint action of the anode and the cathode.

Exemplarily, the plurality of light emitting elements EL included in the plurality of sub-pixels include a red light emitting element EL, a green light emitting element EL and a blue light emitting element EL. The plurality of light emitting elements EL adopt a Real RGB pixel arrangement.

Exemplarily, the display substrate further includes a plurality of gate lines GA, and the gate line GA includes at least a portion extending along the second direction. The plurality of gate lines GA correspond to the plurality of rows of sub-pixel driving circuits in a one-to-one manner, and the gate lines GA are respectively coupled to the gate electrodes T1-*g* of the first transistors T1 included in the corresponding row of sub-pixel driving circuits.

Exemplarily, the first conductive connection portion 11 includes at least a part extending along the first direction.

Exemplarily, the first transistor T1 is a compensation transistor, which can realize threshold voltage compensation for the driving transistor T3.

Exemplarily, the gate electrode T1-*g* of the first transistor T1 is formed as an integral structure with the gate line GA coupled thereto.

Exemplarily, the gate electrode T1-*g* of the first transistor T1 includes a first gate pattern 21 and a second gate pattern 22. The first gate pattern 21 extends along the first direction, and the second gate pattern 22 extends along the second direction. An orthographic projection of the first gate pattern 21 on the base substrate partially overlaps an orthographic projection of a first channel portion 411 included in the first transistor T1 on the base substrate. An orthographic projection of the second gate pattern 22 on the base substrate partially overlaps the orthographic projection of the first channel portion 411 included in the first transistor T1 on the base substrate.

Exemplarily, at least part of the orthographic projection of the first gate pattern 21 on the base substrate is located between the orthographic projection of the first end portion 110 on the base substrate and the orthographic projection of the gate electrode T3-*g* of the driving transistor T3 on the base substrate.

Exemplarily, there is an overlapping area between the orthographic projection of the second electrode T1-2 of the first transistor T1 on the base substrate and the orthographic projection of the first end portion 110 on the base substrate, and the second electrode T1-2 of the first transistor T1 is coupled to the first end portion 110 through the second via hole Via2 in the overlapping area. At least part of the orthographic projection of the gate electrode T1-*g* of the first transistor T1 on the base substrate is located between the orthographic projection of the second via hole Via2 on the base substrate and the orthographic projection of the gate electrode T3-*g* of the driving transistor T3 on the base substrate.

According to the specific structure of the above-mentioned display substrate, in the display substrate provided by the embodiment of the present disclosure, at least part of the orthographic projection of the gate electrode T1-*g* of the first transistor T1 on the base substrate is located between the orthographic projection of the first end portion 110 on the base substrate and the orthographic projection of the gate electrode T3-*g* of the driving transistor T3 on the base substrate; so that the second via hole Via2, the gate electrode T1-*g* of first transistor T1 and the gate electrode T3-*g* of the driving transistor T3 are arranged in sequence along the first direction. This design not only ensures the normal coupling between the first transistor T1 and the driving transistor T3, but also effectively utilizes the vertical layout space of the display substrate along the first direction, the lack of horizontal layout space of the display substrate is overcome. Therefore, the display substrate provided by the embodiments of the present disclosure effectively reduces the layout difficulty of sub-pixels by rationally utilizing the layout space, which is beneficial to the development trend of high pixel resolution of the display substrate.

As shown in FIG. 3 to FIG. 13*b*, in some embodiments, the first conductive connection portion 11 includes at least a part extending along the first direction; the second electrode T1-2 of the first transistor T1 includes a first portion 413, a second portion 414 and a third portion 415 coupled sequentially, each of the first portion 413 and the third portion 415 includes at least a part extending along the second direction, the second portion 414 includes at least a part extending along the first direction that intersects the second direction; the third portion 415 is coupled to the first end portion 110.

Exemplarily, the first portion 413, the second portion 414 and the third portion 415 form an integral structure.

Exemplarily, an orthographic projection of the first portion 413 on the base substrate is located between an orthographic projection of the third portion 415 on the base substrate and the orthographic projection of the gate electrode T3-*g* of the driving transistor T3 on the base substrate.

Exemplarily, there is an overlapping area between the orthographic projection of the third portion 415 on the base and the orthographic projection of the first end portion 110 on the base substrate, and the third portion 415 and the first end portion 110 are coupled through the second via hole Via2 in the overlapping area.

The second electrode T1-2 of the first transistor T1 includes the first portion 413, the second portion 414 and the third portion 415 coupled in sequence, so that the second electrode T1-2 of the first transistor T1 can turn to the position where the first end portion 110 is located, to realize the coupling with the first end portion 110.

The display substrate provided by the above embodiment not only ensures the normal coupling between the first transistor T1 and the driving transistor T3, but also effectively utilizes the vertical layout space of the display substrate along the first direction, the lack of horizontal layout space of the display substrate is overcome. Therefore, the display substrate provided by the embodiments of the present disclosure effectively reduces the layout difficulty of sub-pixels by rationally utilizing the layout space, which is beneficial to the development trend of high pixel resolution of the display substrate.

As shown in FIG. 4, FIG. 5, FIG. 7 and FIG. 10 to FIG. 12, in some embodiments, the first transistor T1 includes a first active layer 41, and the first active layer 41 includes a first channel portion 411, the orthographic projection of the first conductive connection portion 11 on the base substrate overlaps the orthographic projection of the first channel portion 411 on the base substrate.

Exemplarily, the orthographic projection of the first channel portion 411 on the base substrate is covered by the orthographic projection of the gate electrode T1-*g* of the first transistor T1 on the base substrate.

Exemplarily, the first transistor T1 is formed as a double-gate structure, the first active layer 41 in the first transistor T1 includes two first channel portions 411, and an orthographic projection of one first channel portion 411 on the base substrate is covered by the orthographic projection of the first gate pattern 21 on the base substrate, and the orthographic projection of the other first channel portion 411 on the base substrate is covered by the orthographic projection of the second gate pattern 22 on the base substrate.

Exemplarily, the orthographic projection of the first channel portion 411 covered by the first gate pattern 21 on the base substrate partially overlaps the orthographic projection of the first conductive connection portion 11 on the base substrate.

In the above setting, the orthographic projection of the first conductive connection portion 11 on the base substrate partially overlaps the orthographic projection of the first channel portion 411 on the base substrate, so that the orthographic projection of the first end portion 110 on the base substrate, the orthographic projection of the first gate pattern 21 on the base substrate, and the orthographic projection of the gate electrode T3-*g* of the driving transistor T3 on the base substrate are arranged sequentially along the first direction. This design not only ensures the normal coupling between the first transistor T1 and the driving transistor T3, but also effectively utilizes the vertical layout space of the display substrate along the first direction, the lack of horizontal layout space of the display substrate is overcome. The display substrate provided by the above embodiments effectively reduces the layout difficulty of sub-pixels by rationally utilizing the layout space, which is beneficial to the development trend of high pixel resolution of the display substrate.

As shown in FIG. 1, FIG. 3 to FIG. 13*b*, in some embodiments, the display substrate further includes an initialization signal line Vinit; the sub-pixel driving circuit further includes a second transistor T2, and the first electrode of the second transistor T2 is coupled to the initialization signal line Vinit, and the second electrode T2-2 of the second transistor T2 is coupled to the first end portion 110;

The orthographic projection of the first end portion 110 on the base substrate is located between the orthographic projection of the first electrode of the second transistor T2 on the base substrate and the orthographic projection of the gate electrode T1-*g* of the first transistor T1 on the base substrate.

Exemplarily, the display substrate further includes a plurality of initialization signal lines Vinit, and the initialization signal lines Vinit include at least a portion extending along the second direction. The plurality of initialization signal lines Vinit correspond to the plurality of rows of sub-pixel driving circuits in a one-to-one manner, and the initialization signal lines Vinit are respectively coupled to the first electrodes of the second transistors T2 in the corresponding row of sub-pixel driving circuits.

Exemplarily, the display substrate further includes a plurality of reset lines Rst, and at least part of the reset lines Rst extend along the second direction. The plurality of reset lines Rst correspond to the plurality of rows of sub-pixel driving circuits in a one-to-one manner, and the reset lines Rst are respectively coupled to the gate electrodes of the second transistors T2 in the corresponding row of sub-pixel driving circuits.

Exemplarily, the second electrode T2-2 of the second transistor T2 is coupled to the first end portion 110 in the sub-pixel driving circuit to which the second transistor T2 belongs. The second transistor T2 can reset the gate electrode T3-*g* of the driving transistor T3.

In the display substrate provided in the above embodiment, the orthographic projection of the first end portion 110 on the base substrate is located between the orthographic projection of the first electrode of the second transistor T2 on the base substrate and the orthographic projection of the gate electrode T1-*g* of the first transistor T1 on the base substrate; so that the orthographic projection of the first electrode of the second transistor T2 on the base substrate, the orthographic projection of the first end portion 110 on the base substrate and the orthographic projection of the gate electrode T1-*g* of the first transistor T1 on the base substrate are arranged in sequence along the first direction. This design not only ensures the normal coupling of the second transistor T2, the first transistor T1 and the driving transistor T3, but also effectively utilizes the vertical layout space of the display substrate along the first direction, the lack of the horizontal layout space of the display substrate is overcome. Therefore, the display substrate provided by the above embodiment effectively reduces the layout difficulty of sub-pixel by rationally utilizing the layout space, which is beneficial to the development trend of high pixel resolution of the display substrate.

As shown in FIG. 4, FIG. 7, FIG. 10 to FIG. 13*b*, in some embodiments, the second electrode T2-2 of the second transistor T2 includes a fourth portion 422 extending along the first direction; the fourth portion 422 and the second portion 414 are at least partially staggered along the second direction.

Exemplarily, the second transistor T2 further includes a fifth portion 423 extending along the third direction, and the fifth portion 423 is coupled to the fourth portion 422 and the second electrode T1-2 of the first transistor T1. The fourth portion 422 and the fifth portion 423 form an integral structure.

Exemplarily, the third direction intersects both the first direction and the second direction.

Exemplarily, the fifth portion 423 is formed as an integral structure with the second electrode T1-2 of the first transistor T1.

The above-mentioned setting method makes more reasonable use of the layout space of the display substrate, which is beneficial to reduce the layout difficulty of the display substrate.

As shown in FIG. 3 to FIG. 13*b*, in some embodiments, the sub-pixel driving circuit further includes a second conductive connection portion 12; the first electrode of the second transistor T2 is coupled to the initialization signal line Vinit through the second conductive connection portion 12;

The second transistor T2 includes a second active layer 42, the second active layer 42 includes a second channel portion 421, the orthographic projection of the second channel portion 421 on the base substrate at least partially overlaps the orthographic projection of the second conductive connection portion 12 on the base substrate.

Exemplarily, the second conductive connection portion 12 includes at least a part extending along the first direction. The second conductive connection portion 12 and the first conductive connection portion 11 are arranged at the same layer and made of the same material.

Exemplarily, the first electrode of the second transistor T2 is coupled to the second conductive connection portion 12 through a via hole, and the second conductive connection portion 12 is coupled to the initialization signal line Vinit through a via hole.

Exemplarily, the second transistor T2 includes a double-gate transistor. The second active layer 42 includes two second channel portions 421 arranged along the second direction. The orthographic projection of one second channel portion 421 on the base substrate partially overlaps the orthographic projection of the second conductive connection portion 12 on the base substrate.

The orthographic projection of the second channel portion 421 on the base substrate partially overlaps the orthographic projection of the second conductive connection portion 12 on the base substrate, thereby effectively utilizing the horizontal layout space of the display substrate in the second direction, the lack of the horizontal layout space of the display substrate is overcome. Therefore, the display substrate provided by the above embodiment effectively reduces the layout difficulty of sub-pixel by rationally utilizing the layout space, which is beneficial to the development trend of high pixel resolution of the display substrate.

As shown in FIG. 3 to FIG. 13*b*, in some embodiments, the sub-pixel further includes:

a shielding pattern 30, an orthographic projection of the shielding pattern 30 on the base substrate at least partially overlaps the orthographic projection of the second electrode T1-2 of the first transistor T1 on the base substrate, and also at least partially overlaps with the orthographic projection of the second electrodes T2-2 of the second transistor T2 on the base substrate.

Exemplarily, a signal with a fixed potential is loaded on the shielding pattern 30.

Exemplarily, the shielding pattern 30 is made by using the second gate metal layer. The shielding pattern 30 is independent from other structures made using the second gate metal layer.

It should be noted that both the second electrode T1-2 of the first transistor T1 and the second electrode T2-2 of the second transistor T2 are coupled to the first end portion 110. Therefore, the second electrode T1-2 of the first transistor T1 and the second electrode T2-2 of the second transistor T2 can affect the stability of the first end portion 110. However, when the display substrate adopts the Real RGB pixel arrangement method, the horizontal layout space is small. A width of the power line VDD between the first end portion 110 and the data line DA is narrow. Even if the space between the film layers has reached the minimum limit value, the power line VDD still cannot completely cover the first end portion 110, the second electrode T1-2 of the first transistor T1, and the second electrode T2-2 of the second transistor T2, so that the second electrode T1-2 of the first transistor T1 and the second electrode T2-2 of the second transistor T2 that are not shielded are susceptible to interference from other surrounding signals, resulting in the unstable signal of first end portion 110.

The orthographic projection of the shielding pattern 30 on the base substrate at least partially overlaps the orthographic projection of the second electrode T1-2 of the first transistor T1 on the base substrate, and also at least partially overlaps the orthographic projection of the second electrode T2-2 of the second transistor T2 on the base substrate; so that the shielding pattern 30 can effectively shield the second electrode T1-2 of the first transistor T1 and the second electrode T2-2 of the second transistor T2. An effective parasitic capacitor is formed between the shielding pattern 30 and the second electrode T1-2 of the first transistor T1, and between the shielding pattern 30 and the second electrode T2 of the second transistor T2-2, so that the first end portion 110 has better voltage stabilization performance and is not easily interfered by other surrounding signals.

As shown in FIGS. 3 to 13*b*, in some embodiments, the orthographic projection of the shielding pattern 30 on the base substrate covers the orthographic projection of the second portion 414 on the base substrate; the orthographic projection of the shielding pattern 30 on the base substrate at least partially overlaps the orthographic projection of the first portion on the base substrate, and at least partially overlaps the orthographic projection of the third portion 415 on the base substrate.

The above arrangement enables the shielding pattern 30 to effectively shield the second electrode T1-2 of the first transistor T1 and the second electrode T2-2 of the second transistor T2, an effective parasitic capacitor is formed between the shielding pattern 30 and the second electrodes T1-2 of the first transistor T1, and between the shielding pattern 30 and the second electrode T2-2 of the second transistor T2, so that the first end portion 110 has better voltage stabilization performance and is not easily interfered by other surrounding signals.

As shown in FIG. 3 to FIG. 13*b*, in some embodiments, the display substrate further includes a power line VDD; the orthographic projection of the power line VDD on the base substrate at least partially overlaps the orthographic projection of the second electrode T1-2 of the first transistor T1 on the base substrate; the orthographic projection of the power line VDD on the base substrate at least partially overlaps the orthographic projection of the second electrode T2-2 of the second transistor T2 on the base substrate.

Exemplarily, the power line VDD includes at least a portion extending along the first direction, and the power line VDD is used for transmitting power signals.

The above arrangement enables the power line VDD to effectively shield the second electrode T1-2 of the first transistor T1 and the second electrode T2-2 of the second transistor T2, and an effective parasitic capacitor is formed between the power line VDD and the second electrodes T1-2 of the first transistor T1, and between the power line VDD and the second electrode T2-2 of the second transistor T2, so that the first end portion 110 has better voltage stabilization performance and is not easily interfered by other surrounding signals.

As shown in FIG. 3 to FIG. 13*b*, in some embodiments, there is a first overlapping area between the orthographic projection of the shielding pattern 30 on the base substrate and the orthographic projection of the power line VDD on the base substrate. The shielding pattern 30 is coupled to the power line VDD through a first via hole Via1 in the first overlapping area;

The orthographic projection of the first via hole Via1 on the base substrate is located between the orthographic projections of the gate electrode T1-*g* of the first transistor T1 in an adjacent sub-pixel driving circuit along the second direction on the base substrate.

Exemplarily, the orthographic projection of the first via hole Via1 on the base substrate is located between orthographic projections of the first gate patterns 21 of the first transistors T1 in adjacent sub-pixel driving circuits along the second direction on the base substrate.

The shielding pattern 30 is configured to be coupled to the power line VDD through the first via hole Via1 so that the shielding pattern 30 has the same stable potential as the power signal.

The orthographic projection of the first via hole Via1 on the base substrate is located between the orthographic projections of the gate electrodes T1-*g* of the first transistors T1 in the adjacent sub-pixel driving circuits along the second direction on the base substrate. The layout space of the display substrate is effectively utilized, and the layout difficulty of the display substrate is reduced.

As shown in FIG. 3 to FIG. 13*b*, in some embodiments, the first transistor T1 includes a first active layer 41, and the first active layer 41 includes two first channel portions 411, and a conductor portion 412 coupled to the two first channel portions 411 respectively;

The orthographic projection of the shielding pattern 30 on the base substrate at least partially overlaps the orthographic projection of the conductor portion 412 in the adjacent sub-pixel driving circuit on the base substrate.

Exemplarily, the conductor portion 412 is in an L-shaped structure. The conductor portion 412 and the two first channel portions 411 are formed into an integral structure.

The orthographic projection of the shielding pattern 30 on the base substrate at least partially overlaps the orthographic projection of the conductor portion 412 in the adjacent sub-pixel driving circuit on the base substrate, so that the shielding effect of the shielding pattern 30 on the conductor portion 412 in the adjacent sub-pixel driving circuit.

As shown in FIG. 3 to FIG. 13*b*, in some embodiments, the shielding pattern 30 includes a first shielding portion 301 and a second shielding portion 302, and the first shielding portion 301 includes at least part extending along the first direction, the second shielding portion 302 includes at least part extending along the second direction;

The orthographic projection of the first shielding part 301 on the base substrate at least partially overlaps the orthographic projection of the second electrode T1-2 of the first transistor T1 on the base substrate, and also at least partially overlaps the orthographic projection of the second electrode T2-2 of the second transistor T2 on the base substrate; the orthographic projection of the second shielding portion 302 on the base substrate at least partially overlaps the orthographic projections of the conductor portion 412 on the base substrate.

Exemplarily, the shielding pattern 30 is formed as an L-shaped structure. The first shielding part 301 and the second shielding part 302 form an integral structure.

The arrangement above effectively utilizes the layout space of the display substrate and reduces the layout difficulty of the display substrate.

As shown in FIG. 3 to FIG. 13*b*, in some embodiments, the display substrate further includes a data line DA; the sub-pixel driving circuit further includes a fourth transistor T4, a first electrode of the fourth transistor T4 is coupled to the corresponding data line DA, and a second electrode of the fourth transistor T4 is coupled to the first electrode of the driving transistor T3;

At least a part of the orthographic projection of the first shielding portion 301 on the base substrate is located between the orthographic projection of the first end portion 110 on the base substrate and the orthographic projection of the first electrode of the fourth transistor T4 on the base substrate.

Figure 13A:
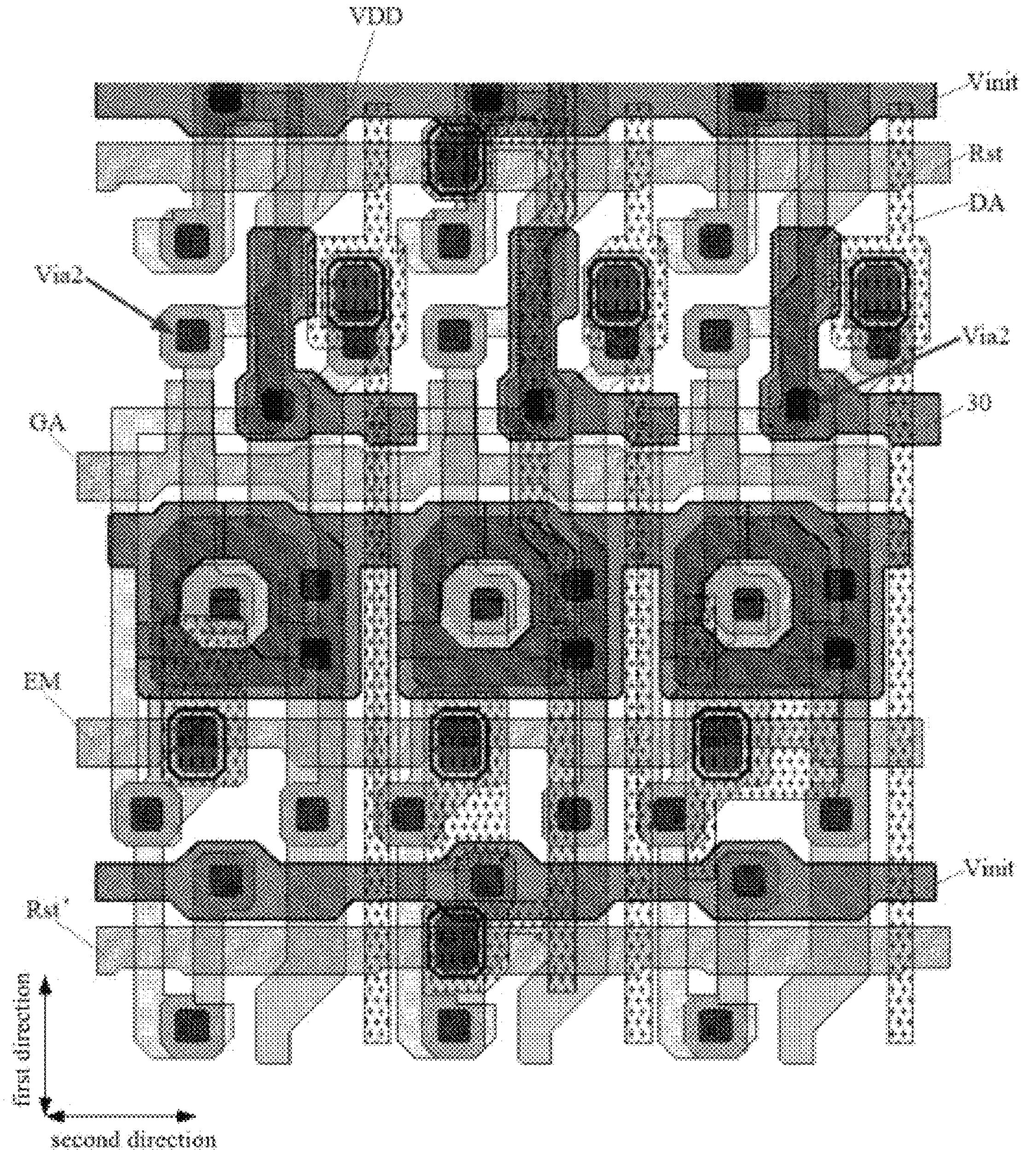
FIG. 13*a* is a schematic diagram of the layout from the active layer to the second source/drain the metal layer in FIG. 3.
Figure 13B:
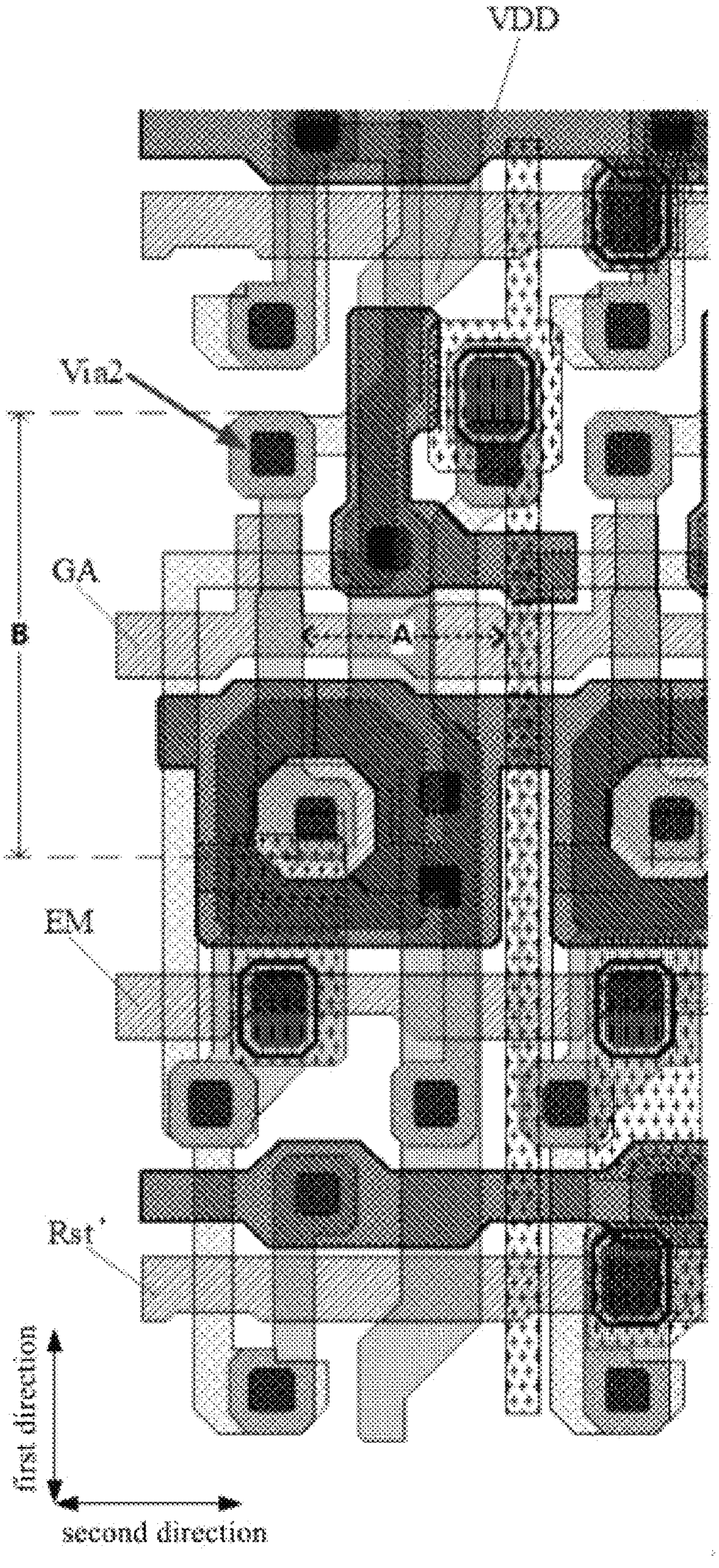
FIG. 13*b* is a schematic diagram of the layout of one sub-pixel in FIG. 13*a;*

The gate line GA in the foregoing embodiment provides control signals for the first transistor T1 and the fourth transistor T4; as shown in FIG. 13*b*, the minimum distance between an overlapping area between the gate line and the first conductive connection part in a direction perpendicular to the base substrate and an overlapping area between the gate line and the data line in the direction perpendicular to the base substrate is A, and a maximum length of the first conductive connection portion in the extending direction of the data line (that is, the first direction) is B, where the ratio of A to B ranges from 0.3 to 0.6.

Exemplarily, the display substrate further includes a plurality of data lines DA, and the data lines DA include at least a part extending along the first direction. The plurality of data lines DA correspond to the plurality of columns of sub-pixel driving circuits in a one-to-one manner. The data line DA is coupled to the first electrodes of the fourth transistors T4 in a corresponding row of sub-pixel driving circuits.

Exemplarily, the gate line GA is respectively coupled to the gate electrodes of the fourth transistors T4 included in each sub-pixel driving circuit in a corresponding row of sub-pixel driving circuits. The second electrode of the fourth transistor T4 is coupled to the first electrode of the driving transistor T3 in the sub-pixel driving circuit to which the fourth transistor T4 belongs.

Exemplarily, at least part of the orthographic projection of the first shielding portion 301 on the base substrate is located between the orthographic projection of the first end portion 110 on the base substrate and the orthographic projection of the third conductive connection portion 13 on the base substrate.

Exemplarily, at least a part of the orthographic projection of the second shielding portion 302 on the base substrate is located between the orthographic projection of the third conductive connection portion 13 on the base substrate and the orthographic projection of the gate line GA coupled to the sub-pixel to which the second shielding portion 302 belongs on the base substrate.

In the display substrate provided by the above embodiment, at least part of the orthographic projection of the first shielding portion 301 on the base substrate is located between the orthographic projection of the first end portion 110 on the base substrate and the orthographic projections of the first electrode of the fourth transistor T4 on the base substrate, the impact of data signal changes on the signal stability of the first terminal 110 is effectively shielded.

As shown in FIG. 3 to FIG. 13, in some embodiments, at least part of the first electrode of the fourth transistor T4 and the first end portion 110 are arranged along the second direction.

The arrangement above effectively utilizes the lateral layout space of the display substrate, and reduces the layout difficulty of the display substrate.

As shown in FIG. 3 to FIG. 13*b*, in some embodiments, at least part of the power line VDD extends along the first direction; the power line includes a first sub-portion VDD1 and a second sub-portion VDD2, the width of the first sub-portion VDD1 is smaller than the width of the second sub-portion VDD2 in a direction vertical to the first direction;

At least part of the orthographic projection of the first sub-portion VDD1 on the base substrate is located between the orthographic projection of the first end portion 110 on the base substrate and the orthographic projection of the first electrode of the fourth transistor T4 on the base substrate.

Exemplarily, the power line includes a plurality of first sub-portions VDD1 and a plurality of second sub-portion VDD2, the first sub-portions VDD1 and the second sub-portions VDD2 are arranged alternately, and the first sub-portion VDD1 and the second sub-portion VDD2 form an integral structure.

Because the width of the first sub-portion VDD1 is smaller than the width of the second sub-portion VDD2 in the direction perpendicular to the first direction; at least part of the orthographic projection of the first sub-portion VDD1 on the base substrate is located between the orthographic projection of the first end portion 110 on the base substrate and the orthographic projection of the first electrode of the fourth transistor T4 on the base substrate; which is beneficial to reduce the overall horizontal layout space occupied by the first sub-portion VDD1, the first end portion 110 and the first electrode of the fourth transistor T4, effectively reduces the layout difficulty of the display substrate.

As shown in FIG. 3 to FIG. 13*b*, in some embodiments, the sub-pixel driving circuit further includes a third conductive connection portion 13, and the third conductive connection portion 13 is respectively coupled to the first electrode of the fourth transistor T4 and the corresponding data line DA; the third conductive connection portion 13 and the first sub-portion VDD1 are arranged along the second direction.

Exemplarily, there is an overlapping area between the orthographic projection of the third conductive connection portion 13 on the base substrate and the orthographic projection of the first electrode of the fourth transistor T4 on the base substrate, and the third conductive connection portion 13 is coupled to the first electrode of the fourth transistor T4 through a via in the overlapping area. There is an overlapping area between the orthographic projection of the third conductive connection portion 13 on the base substrate and the orthographic projection of the data line DA on the base substrate, and the third conductive connection portion 13 and the data line DA are coupled to each other through a via hole in the overlapping area.

The arrangement of the third conductive connection portion 13 and the first sub-portion VDD1 arranged along the second direction rationally utilizes the lateral layout space of the display substrate and effectively reduces the layout difficulty of the display substrate.

As shown in FIG. 3 to FIG. 13*b*, in some embodiments, the sub-pixel driving circuit further includes a storage capacitor Cst, and the gate electrode T3-*g* of the driving transistor T3 is reused as the first electrode plate Cst1 of the storage capacitor Cst, the second electrode plate Cst2 of the storage capacitor Cst is coupled to the power line VDD; the second electrode plate Cst2 of the storage capacitor Cst and the shielding pattern 30 are arranged at the same layer and made of a same material.

Exemplarily, the second electrode plates Cst2 located in the same row along the second direction are coupled in sequence to form an integrated structure.

As shown in FIG. 1, FIG. 3 to FIG. 13*b*, in some embodiments, the display substrate further includes a plurality of light-emitting control lines EM and a plurality of reset lines Rst; the sub-pixels also include light-emitting elements EL; the sub-pixel driving circuit further includes a fifth transistor T5, a sixth transistor T6 and a seventh transistor T7;

The gate electrode of the fifth transistor T5 is coupled to the corresponding light-emitting control line EM, the first electrode of the fifth transistor T5 is coupled to the power line VDD, and the second electrode of the fifth transistor T5 coupled to the first electrode of the driving transistor T3;

The gate electrode of the sixth transistor T6 is coupled to the corresponding light-emitting control line EM, the first electrode of the sixth transistor T6 is coupled to the second electrode of the driving transistor T3, and the second electrode of the sixth transistor T6 is coupled to the light-emitting element EL;

The gate electrode of the seventh transistor T7 is coupled to the corresponding reset line Rst, the first electrode of the seventh transistor T7 is coupled to the initialization signal line Vinit, and the second electrode of the seventh transistor T7 is coupled to the light-emitting element EL.

Exemplarily, the display substrate includes a plurality of light-emitting control lines EM, the plurality of light-emitting control lines EM correspond to the plurality of rows of sub-pixel driving circuits in a one-to-one manner, and the light-emitting control lines EM are coupled to the gate electrode of the fifth transistors T5 and the gate electrodes of the sixth transistors T6 included in a corresponding row of sub-pixel driving circuits.

Exemplarily, the display substrate includes a plurality of reset lines Rst, the plurality of reset lines Rst are in one-to-one correspondence with the plurality of rows of sub-pixel driving circuits, and the reset lines Rst are coupled to the gate electrodes of the seventh transistors T7 included in the corresponding row of sub-pixel driving circuits respectively.

Exemplarily, in two adjacent rows of sub-pixel driving circuits along the first direction, the gate electrodes of the seventh transistors T7 in a previous row of sub-pixel driving circuits and the gate electrodes of the second transistors T2 in the current row of sub-pixel driving circuits are coupled to the same reset line Rst'.

Exemplarily, in the two adjacent rows of sub-pixel driving circuits along the first direction, the first electrodes of the seventh transistors T7 in the previous row of sub-pixel driving circuits and the first electrodes of the second transistors T2 in the current row of sub-pixel driving circuits are coupled to the same initialization signal line Vinit.

Figure 14:
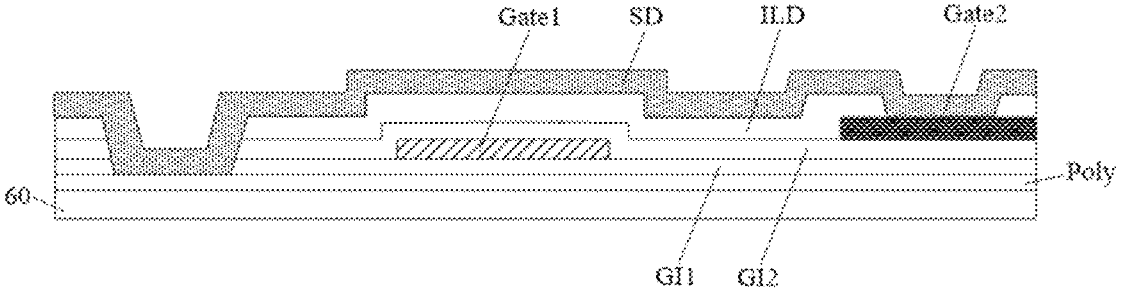
FIG. 14 is a first sectional diagram of the display substrate according to an embodiment of the present disclosure.
Figure 15:
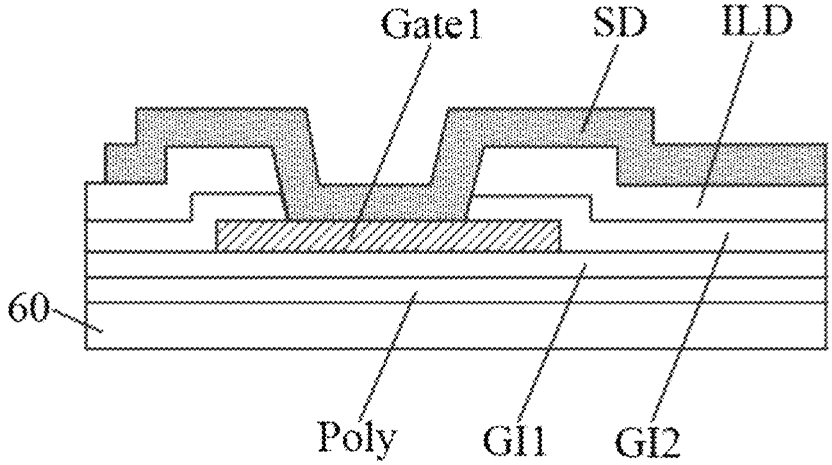
FIG. 15 is a second sectional diagram of the display substrate according to an embodiment of the present disclosure.

As shown in FIG. 14 and FIG. 15, for example, the display substrate includes an active layer poly, a first gate insulating layer GI1, a first gate metal layer Gate1, a second gate insulating layer GI2, a second gate metal layer Gate2, an interlayer insulating layer ILD, a first source-drain metal layer SD1, a first planarization layer, a second source-drain metal layer, a second planarization layer, an anode layer, a light-emitting functional layer, a cathode layer and an encapsulation layer that are arranged in sequence along a direction away from the base substrate 60.

Figure 4:
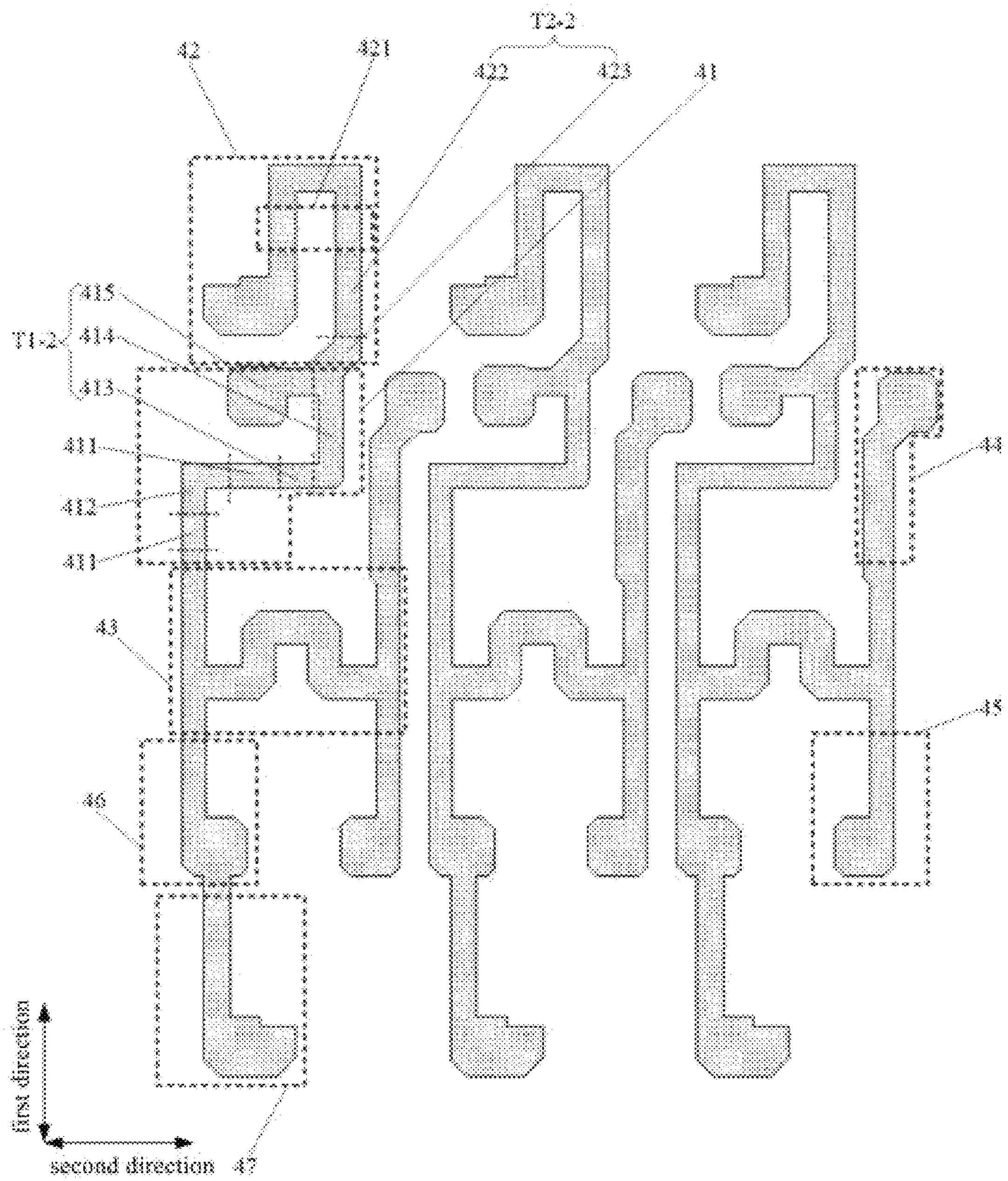
FIG. 4 is a schematic diagram of the layout of the active layer in FIG. 3.
Figure 5:
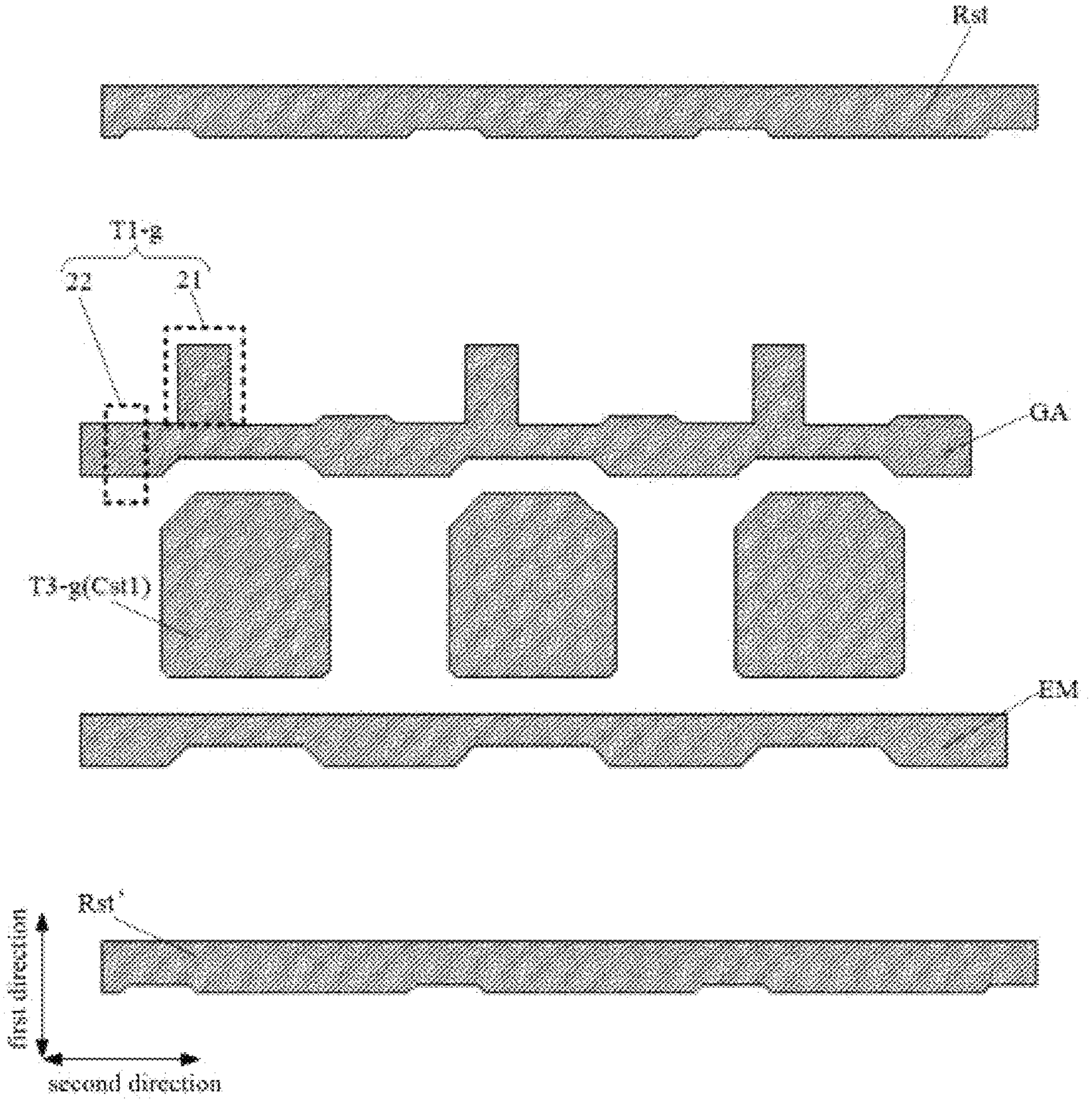
FIG. 5 is a schematic diagram of the layout of the first gate metal layer in FIG. 3.
Figure 6:
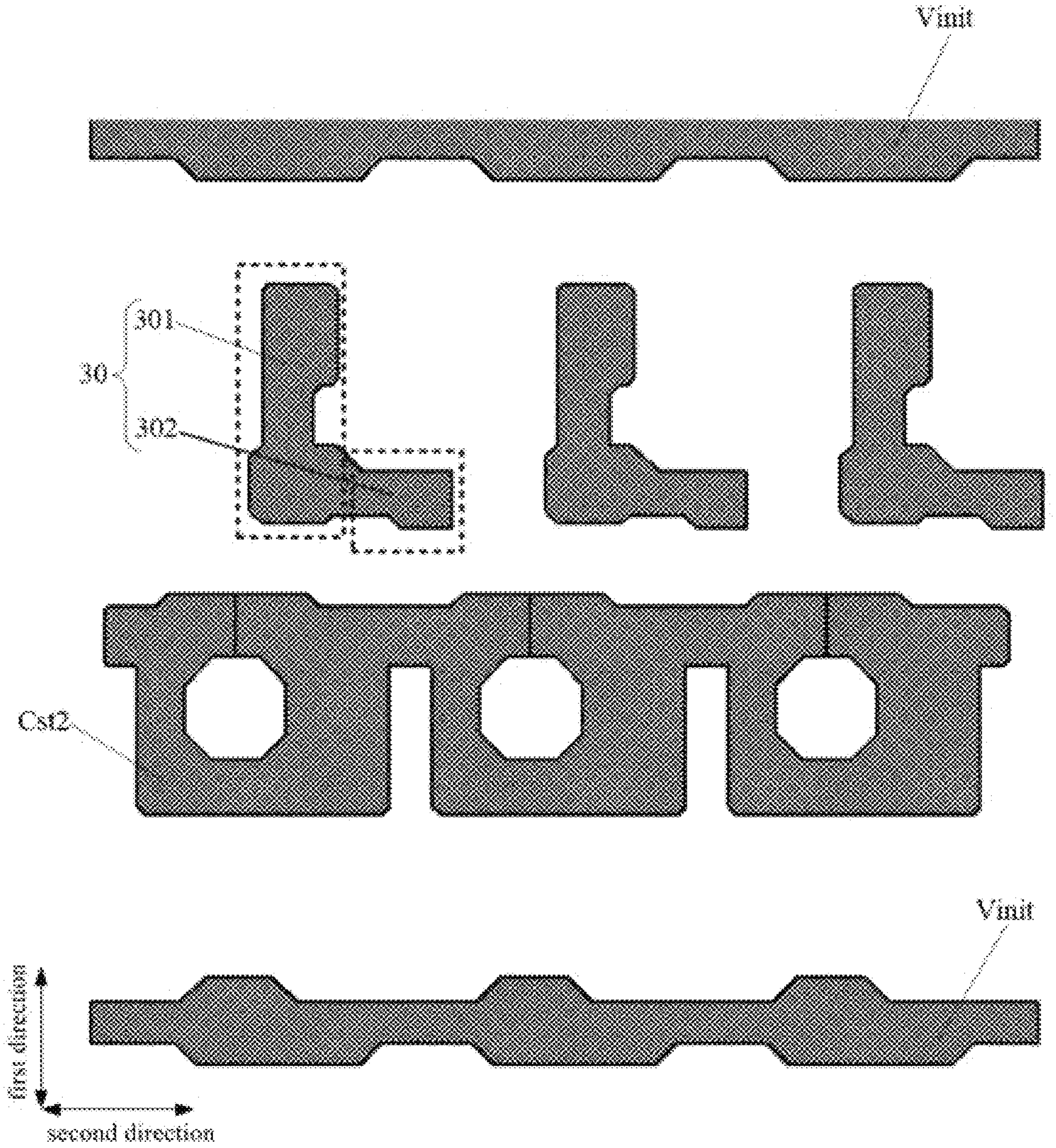
FIG. 6 is a schematic diagram of the layout of the second gate metal layer in FIG. 3.
Figure 7:
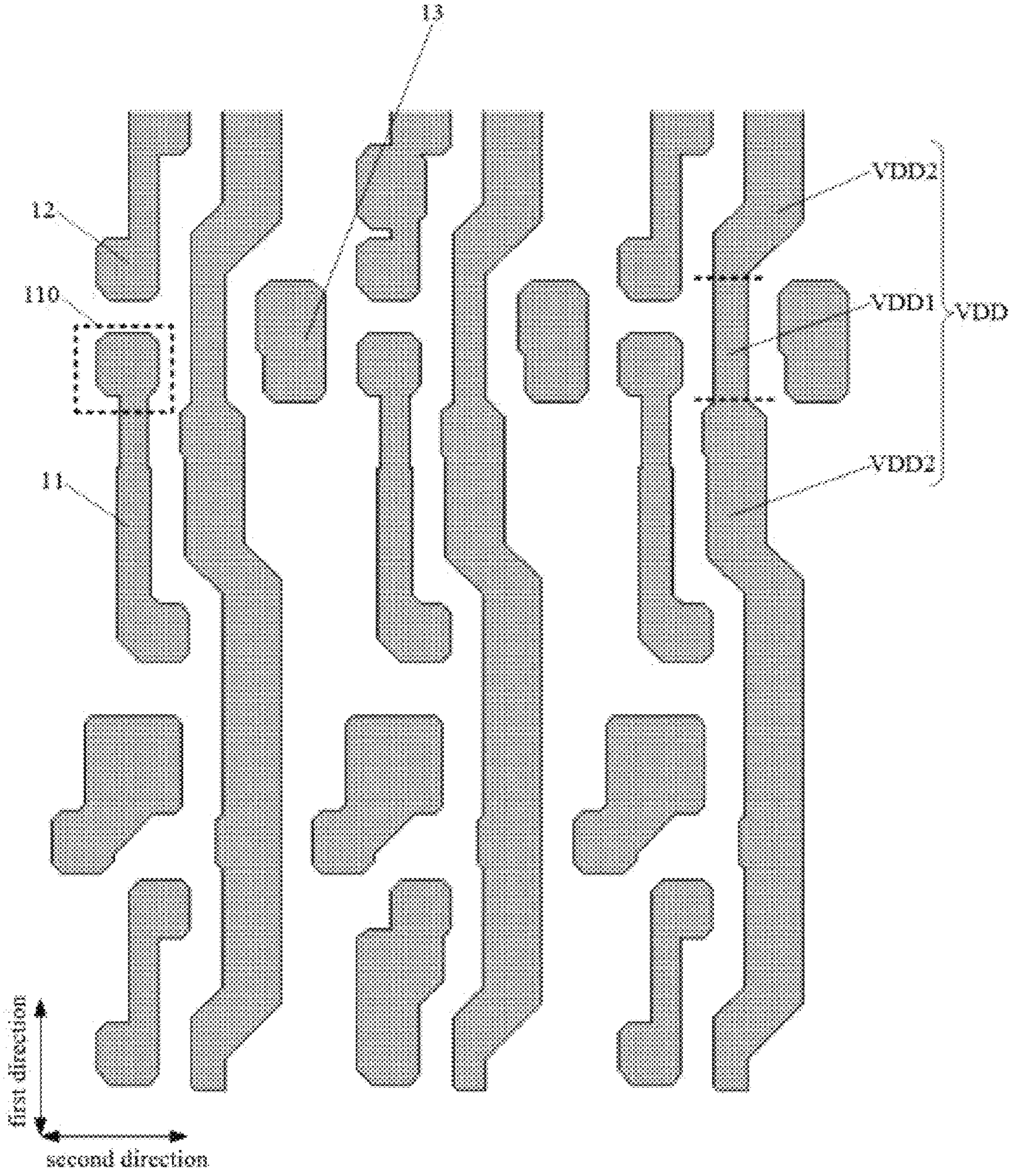
FIG. 7 is a schematic diagram of the layout of the first source/drain metal layer in FIG. 3.
Figure 8:
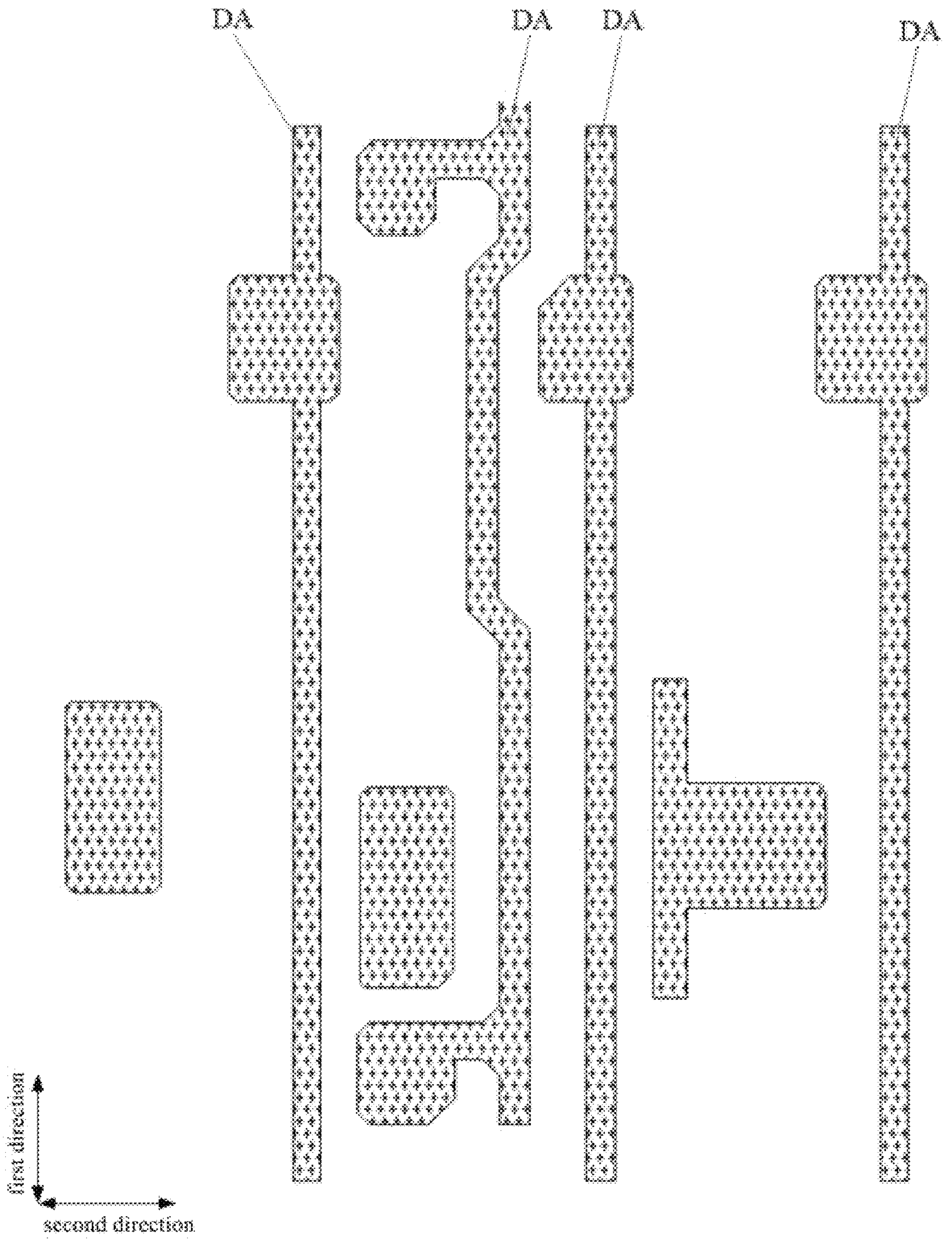
FIG. 8 is a schematic diagram of the layout of the second source/drain metal layer in FIG. 3.
Figure 9:
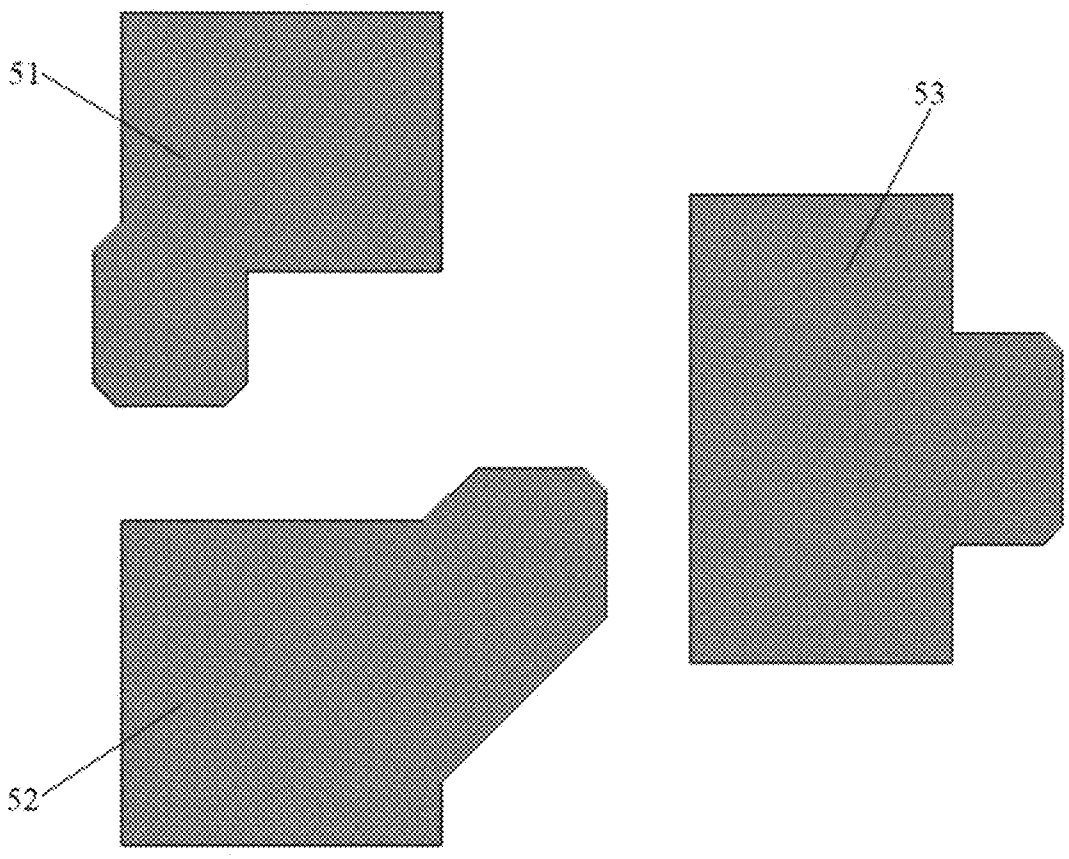
FIG. 9 is a schematic diagram of the layout of the anode layer in FIG. 3.
Figure 10:
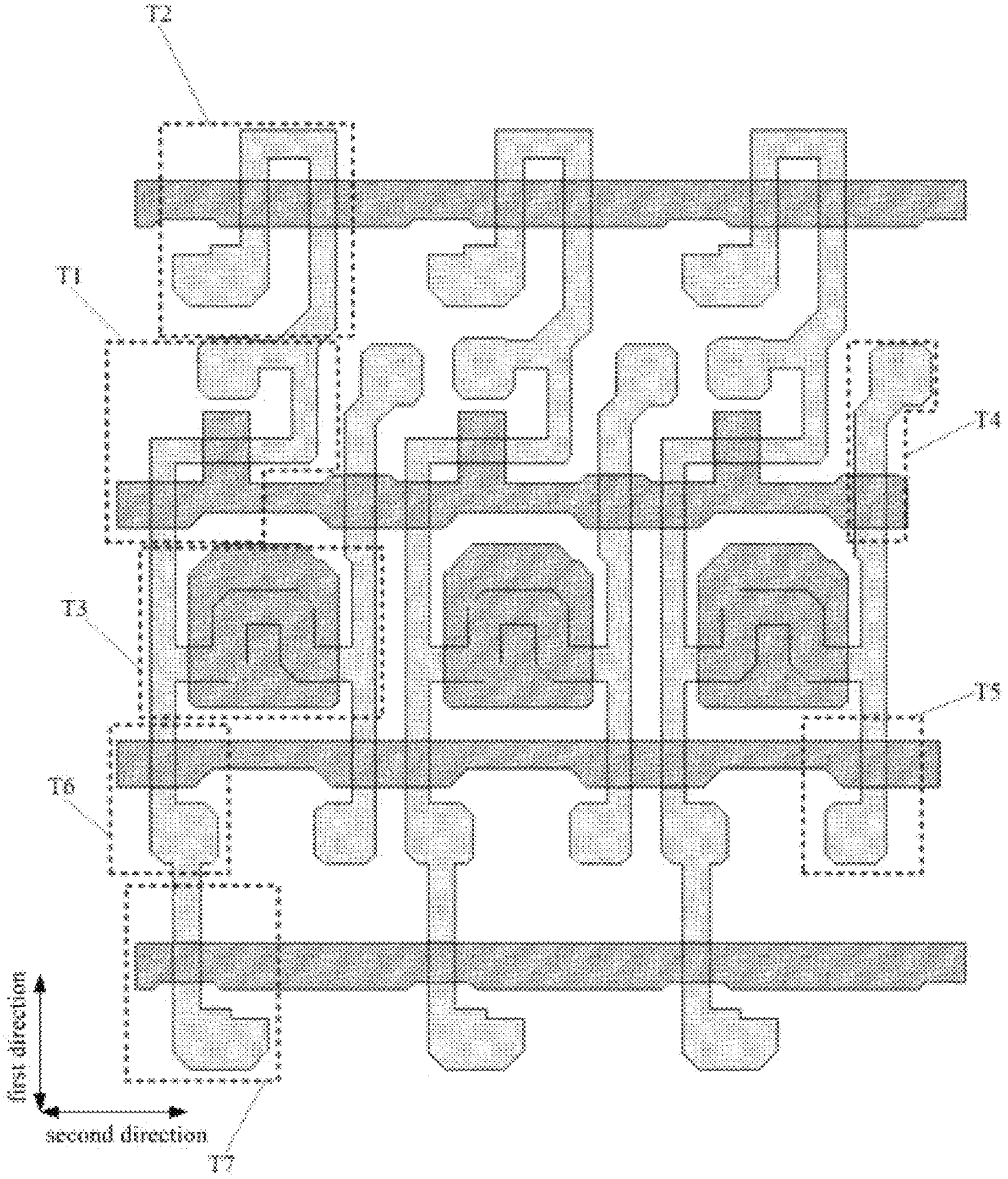
FIG. 10 is a schematic diagram of the layout of the active layer and the first gate metal layer in FIG. 3.
Figure 11:
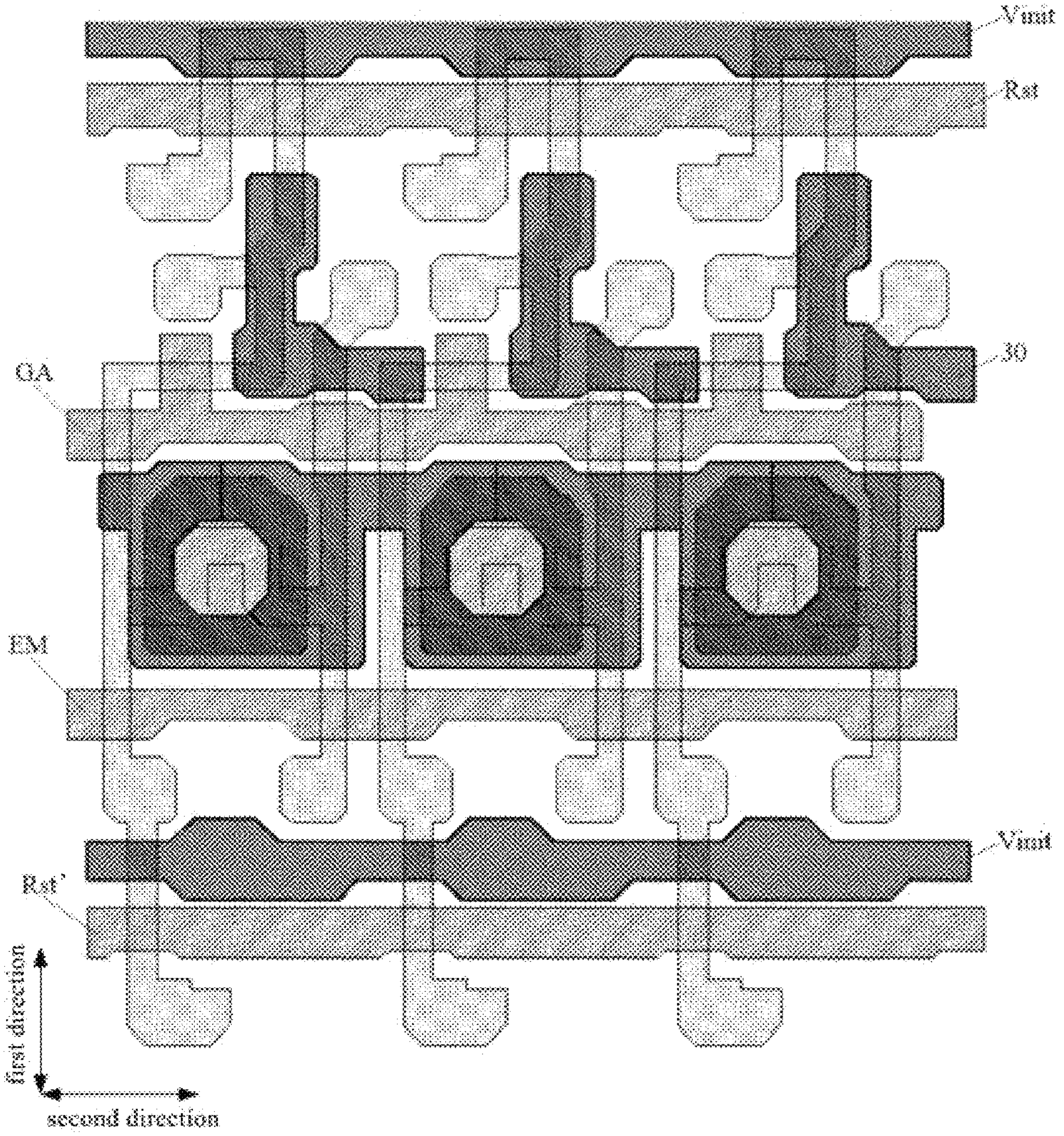
FIG. 11 is a schematic diagram of the layout of the active layer, the first gate metal layer and the second gate metal layer in FIG. 3.
Figure 12:
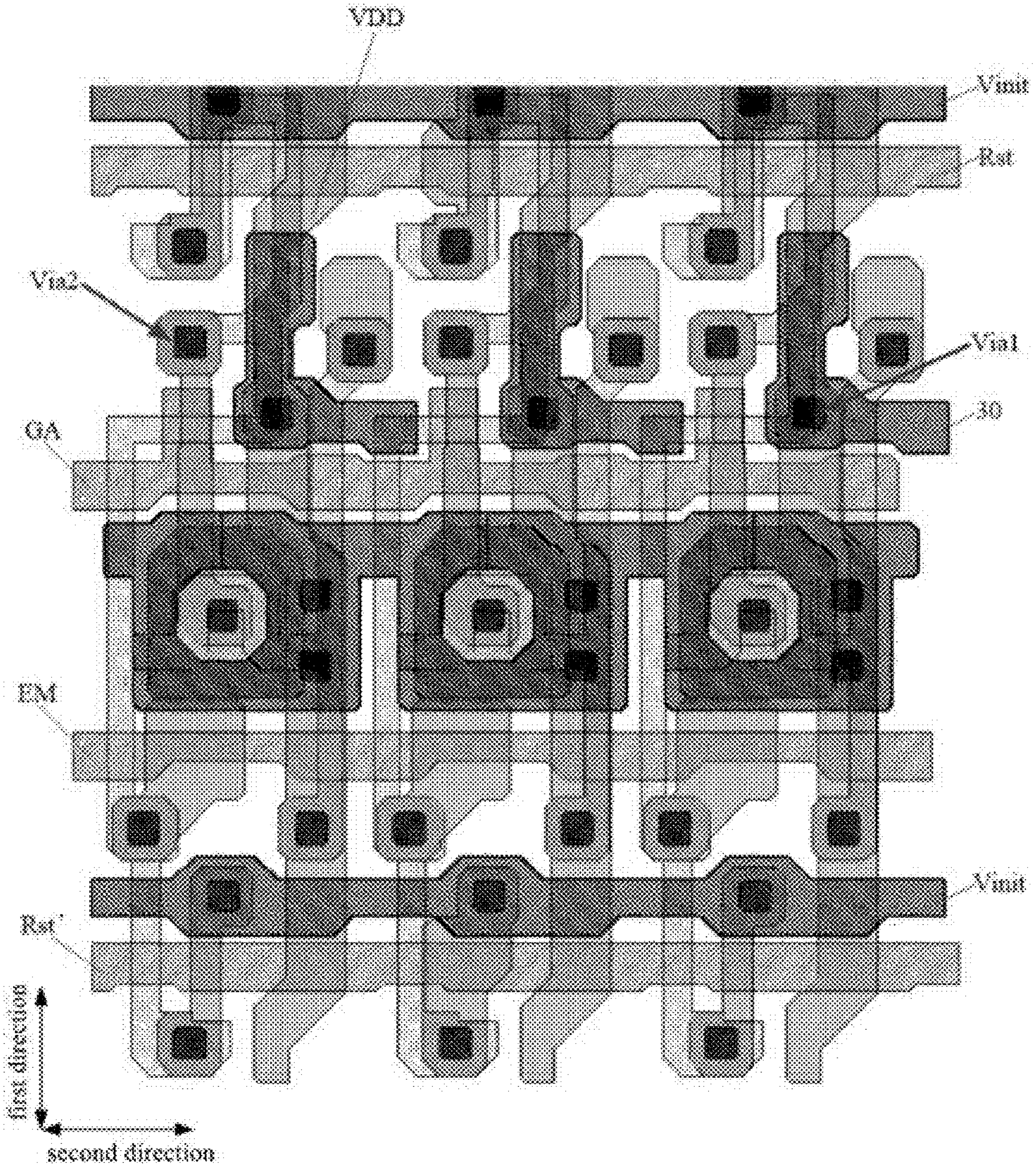
FIG. 12 is a schematic diagram of the layout from the active layer to the first source/drain the metal layer in FIG. 3.

As shown in FIG. 4, for example, the active layer is used to form the first active layer 41, the second active layer 42 included in the second transistor T2, and the third active layer 43 included in the driving transistor T3, the fourth active layer 44 included in the fourth transistor T4, the fifth active layer 45 included in the fifth transistor T5, and the sixth active layer 46 included in the sixth transistor T6 and the seventh active layer 47 included in the seventh transistor T7.

Exemplarily, the first gate metal layer Gate1 is used to form the reset line Rst, the gate line GA, the light-emitting control line EM, and the gate electrodes of the transistors.

Exemplarily, the second gate metal layer Gate2 is used to form the initialization signal line Vinit, the shield pattern 30 and the second electrode plate of the storage capacitor Cst.

Exemplarily, the first source-drain metal layer SD1 is used to form the power line VDD, the first conductive connection portion 11, the second conductive connection portion 12 and the third conductive connection portion 13.

Exemplarily, the second source-drain metal layer is used to form the data line DA.

Exemplarily, the anode layer is used to form an anode pattern included in each light-emitting element EL.

Exemplarily, the base substrate of the display substrate includes an organic P1 base substrate. The manufacturing process of the display substrate includes:

Depositing an active material layer on the base substrate, and patterning the active material layer to form the active layer. It should be noted that the patterning process includes: forming a photoresist on a side of the active material layer away from the base substrate, exposing and developing the photoresist, and then etching the active material layer using remaining photoresist as a mask, to form the active layer.

Depositing an inorganic material on a side of the active layer away from the base substrate to form the first gate insulating layer GI1.

Depositing a metal material on a side of the first gate insulating layer GI1 away from the base substrate to form a first gate metal material layer, and patterning the first gate metal material layer to form the first gate metal material layer Gate1.

Depositing an inorganic material on a side of the first gate metal layer Gate1 away from the base substrate to form the second gate insulating layer GI2.

Depositing a metal material on a side of the second gate insulating layer GI2 away from the base substrate to form a second gate metal material layer, and patterning the second gate metal material layer to form the second gate metal material layer Gate2.

As shown in FIG. 14 and FIG. 15, the interlayer insulating layer ILD is formed by depositing on the side of the second gate metal layer Gate2 away from the base substrate. A patterning process is performed to form a plurality of via holes. The first part via holes of the plurality of via holes only penetrate the interlayer insulating layer ILD, the first part of the via holes can expose the second gate metal layer Gate2, and the first source-drain metal layer SD1 is coupled to the second gate metal layer Gate2 through the first part of via holes. A second part of the plurality of via holes can penetrate through the interlayer insulating layer ILD, the second gate insulating layer GI2 and the first gate insulating layer GI1, and the second part of the via holes can expose the active layer, and the first source-drain metal layer SD1 can be coupled to the active layer through a second part of via holes. The plurality of via holes may further include a third part of via holes, the third part of via holes can penetrate through the interlayer insulating layer ILD and the second gate insulating layer GI2, and the third part of via holes can expose the first gate metal layer Gate1, and the first source-drain metal layer SD1 can be coupled to the first gate metal layer Gate1 through a third part of via holes.

A metal material layer is deposited on the side of the interlayer insulating layer ILD away from the base substrate, and the metal material layer is patterned to form the first source-drain metal layer SD1.

Figure 2:
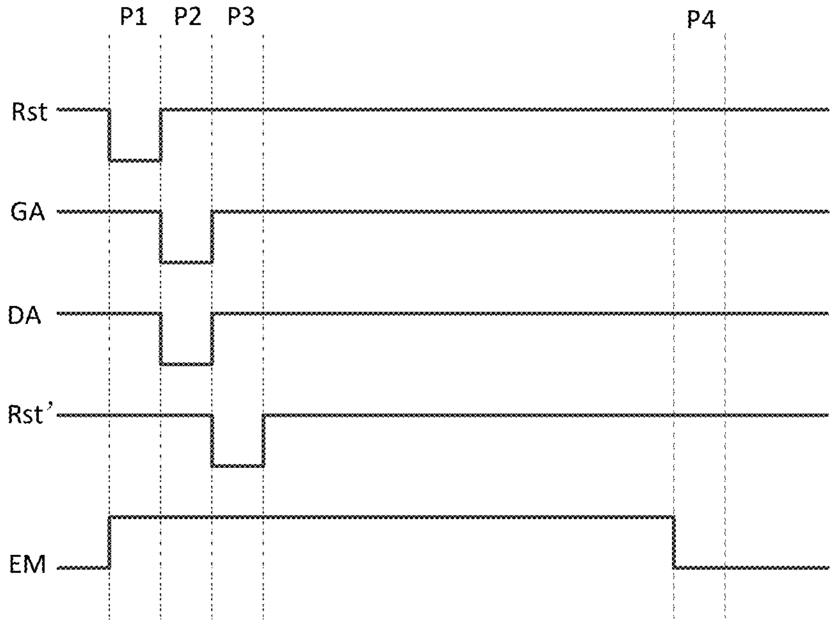
FIG. 2 is a driving timing diagram of the sub-pixel driving circuit according to an embodiment of the present disclosure.
Figure 3:
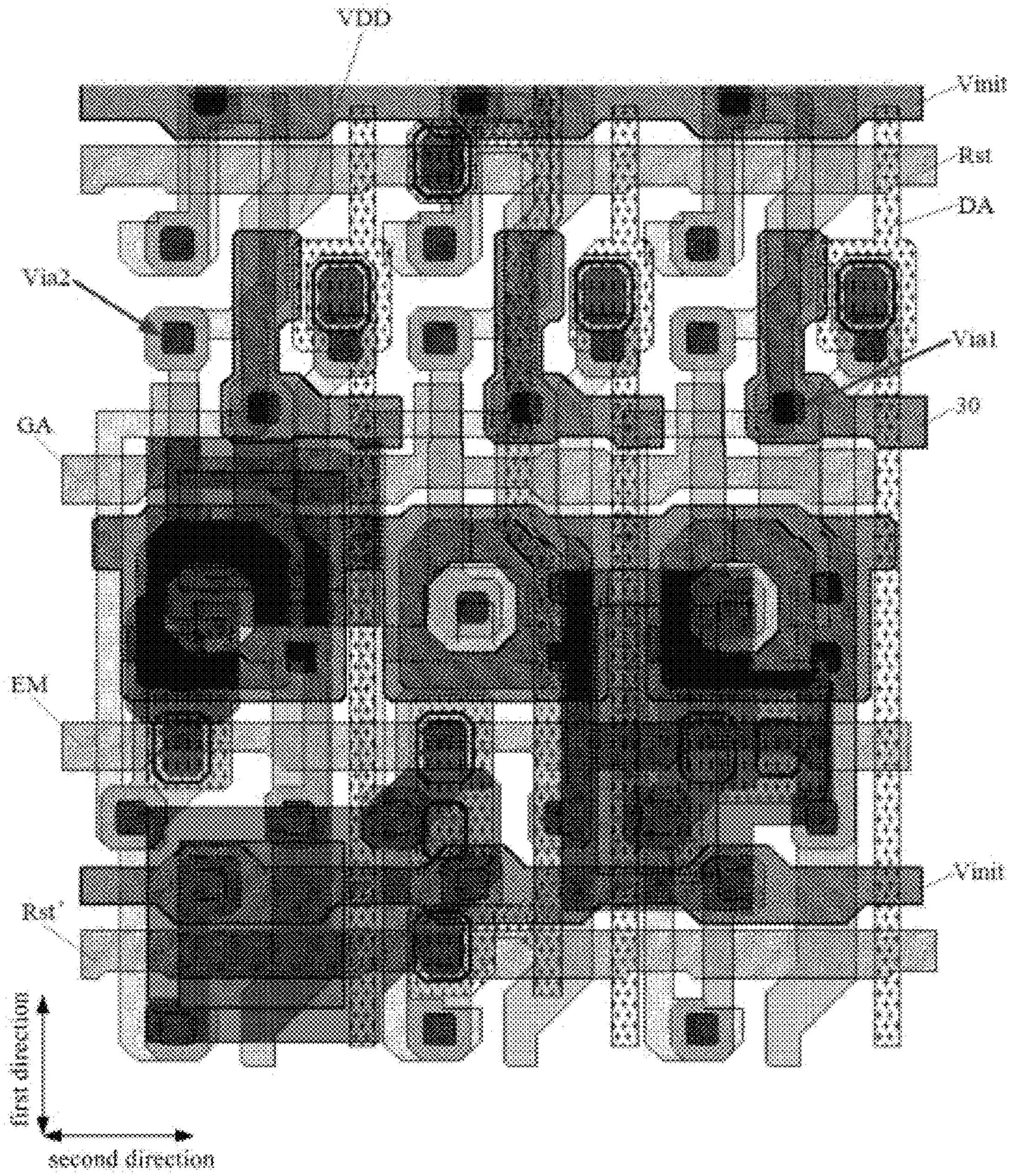
FIG. 3 is a schematic diagram of the layout of the sub-pixels according to an embodiment of the present disclosure.

As shown in FIG. 1 and FIG. 2, when the sub-pixel driving circuit with the above structure is in operation, each working period includes a first reset phase P1, a writing-in compensation phase P2, a second reset phase P3 and a light emitting phase P4.

In the first reset phase P1, the reset signal inputted by the reset line Rst is at an active level, the second transistor T2 is turned on, and the initialization signal transmitted by the initialization signal line Vinit is inputted to the gate electrode T3-*g* of the driving transistor T3, so that the gate-source voltage Vgs maintained on the driving transistor T3 in the previous frame is cleared to reset the gate electrode T3-*g* of the driving transistor T3.

In the writing-in compensation phase P2, the reset signal is at an inactive level, the second transistor T2 is turned off, the gate scanning signal inputted by the gate line GA is at an active level, and the first transistor T1 and the fourth transistor T4 are controlled to be turned on, the data signal is written into the data line DA and transmitted to the first electrode of the driving transistor T3 through the fourth transistor T4. At the same time, the first transistor T1 and the fourth transistor T4 are turned on, so that the driving transistor T3 is formed into a diode structure, so the first transistor T1, the driving transistor T3 and the fourth transistor T4 are cooperated to realize the threshold voltage compensation of the driving transistor T3. When the compensation time is long enough, the potential of the gate electrode T3-*g* of the driving transistor T3 can be controlled to finally reach Vdata+Vth, wherein, Vdata represents the voltage value of the data signal, and Vth represents the threshold voltage of the driving transistor T3.

In the second reset phase P3, the gate scanning signal is at an inactive level, the first transistor T1 and the fourth transistor T4 are both turned off, and the reset signal inputted by the reset line Rst' coupled to an adjacent next row of sub-pixels is at the active level, to control the seventh transistor T7 to be turned on, and the initialization signal inputted by the initialization signal line Vinit coupled to the adjacent new row of sub-pixels is inputted to the anode of the light-emitting element EL to control the light-emitting element EL not to emit light.

In the light-emitting phase P4, the light-emitting control signal written by the light-emitting control line EM is at an active level, and the fifth transistor T5 and the sixth transistor T6 are controlled to be turned on, so that the power signal transmitted by the power line VDD is inputted to the first electrode of the driving transistor T3. At the same time, since the gate electrode T3-*g* of the driving transistor T3 is maintained at Vdata+Vth, the driving transistor T3 is turned on, and the gate-source voltage corresponding to the driving transistor T3 is Vdata+Vth-VDD, wherein VDD is the voltage value corresponding to the power signal, the leakage current generated based on the gate-source voltage flows to the anode of the corresponding light-emitting element EL, to drive the corresponding light-emitting element EL to emit light.

As shown in FIG. 3 to FIG. 13*b*, in some embodiments, the plurality of sub-pixels are divided into a plurality of pixel units, each pixel unit includes a first sub-pixel, a second sub-pixel and a third sub-pixel; the first sub-pixel includes a first anode pattern 51, the second sub-pixel includes a second anode pattern 52, and the third sub-pixel includes a third anode pattern 53; the first anode pattern 51 and the second anode pattern 52 are located in the same column along the first direction, and the third anode pattern 53 is located in another column.

Exemplarily, the first sub-pixel includes a red sub-pixel, the second sub-pixel includes a green sub-pixel, and the third sub-pixel includes a blue sub-pixel. The display substrate adopts a Real RGB pixel arrangement.

Under a fixed pixel resolution, setting the display substrate to adopt a Real RGB pixel arrangement is beneficial to improving the display effect of the display substrate.

Embodiments of the present disclosure also provide a display device, including the display substrate provided in the above embodiments.

It should be noted that the display device can be any product or component with a display function such as a TV, a monitor, a digital photo frame, a mobile phone, a tablet computer, etc., wherein the display device also includes a flexible circuit board, a printed circuit board and a back plate etc.

In the display substrate provided by the above embodiment, by setting at least part of the orthographic projection of the gate electrode T1-*g* of the first transistor T1 on the base substrate is located between the orthographic projection of the first end portion 110 on the base substrate and the orthographic projection of the gate electrode T3-*g* of the driving transistor T3 on the base substrate; the second via hole Via2, the gate electrode T1-*g* of the first transistor T1 and the gate electrode T3-*g* of the driving transistors T3 are arranged sequentially along the first direction. This design not only ensures the normal coupling between the first transistor T1 and the driving transistor T3, but also effectively utilizes the vertical layout space of the display substrate along the first direction, the lack of horizontal layout space of the display substrate is overcome. Therefore, the display substrate provided by the above embodiment effectively reduces the layout difficulty of sub-pixel by rationally utilizing the layout space, which is beneficial to the development trend of high pixel resolution of the display substrate.

When the display device provided by the embodiments of the present disclosure includes the above-mentioned display substrate, it also has the above-mentioned beneficial effects, which will not be repeated here.

It should be appreciated that, the expression "at a same layer" refers to that the film layers are arranged on a same structural layer. Alternatively, for example, the film layers on a same layer may be layer structures formed through forming thin layers for forming specific patterns through a single-film-forming process and then patterning the film layers with a same mask through a single patterning process. Depending on different specific patterns, a single patterning process may include a plurality of exposing, development or etching processes, and the specific patterns in the layer structure may be continuous or discontinuous. These specific patterns may also be arranged at different levels or have different thicknesses.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising: a base substrate and a plurality of sub-pixels arranged on the base substrate, wherein the display substrate further includes a data line; the sub-pixel include a sub-pixel driving circuit, the sub-pixel driving circuit includes: a first transistor, a fourth transistor, a driving transistor, and a first conductive connection portion;

a first electrode of the first transistor is coupled to a second electrode of the driving transistor, a second electrode of the first transistor and a first end portion of the first conductive connection portion are arranged at different layers, the second electrode of the first transistor and the first end portion of the first conductive connection portion are coupled through a via hole; a second end portion of the first conductive connection portion is coupled to a gate electrode of the driving transistor;

a first electrode of the fourth transistor is coupled to a corresponding data line, a second electrode of the fourth transistor is coupled to a first electrode of the driving transistor;

at least part of an orthographic projection of the gate electrode of the first transistor on the base substrate is located between an orthographic projection of the first end portion on the base substrate and an orthographic projection of the gate electrode of the driving transistor on the base substrate;

wherein the first conductive connection portion includes at least a part extending along a first direction;

the second electrode of the first transistor includes a first portion, a second portion and a third portion coupled sequentially, each of the first portion and the third portion includes at least a part extending along a second direction, the second portion includes at least a part extending along the first direction, the first direction intersects the second direction; the third portion is coupled to the first end portion;

wherein the display substrate further includes an initialization signal line; the sub-pixel driving circuit further includes a second transistor, and the first electrode of the second transistor is coupled to the initialization signal line, and the second electrode of the second transistor is coupled to the first end portion;

an orthographic projection of the first end portion on the base substrate is located between an orthographic projection of the first electrode of the second transistor on the base substrate and the orthographic projection of the gate electrode of the first transistor on the base substrate;

wherein the sub-pixel driving circuit further includes a second conductive connection portion; the first electrode of the second transistor is coupled to the initialization signal line through the second conductive connection portion;

the second transistor includes a second active layer, the second active layer includes a second channel portion, an orthographic projection of the second channel portion on the base substrate at least partially overlaps an orthographic projection of the second conductive connection portion on the base substrate.

2. The display substrate according to claim 1, wherein the first transistor includes a first active layer, and the first active layer includes a first channel portion, the orthographic projection of the first conductive connection portion on the base substrate overlaps the orthographic projection of the first channel portion on the base substrate.

3. The display substrate according to claim 1, wherein the second electrode of the second transistor includes a fourth portion extending along the first direction; the fourth portion and the second portion are at least partially staggered along the second direction.

4. The display substrate according to claim 1, wherein the sub-pixel further includes:

a shielding pattern, wherein an orthographic projection of the shielding pattern on the base substrate at least partially overlaps an orthographic projection of the second electrode of the first transistor on the base substrate, and also at least partially overlaps an orthographic projection of the second electrode of the second transistor on the base substrate.

5. The display substrate according to the claim 4, wherein the orthographic projection of the shielding pattern on the base substrate covers an orthographic projection of the second portion on the base substrate; the orthographic projection of the shielding pattern on the base substrate at least partially overlaps an orthographic projection of the first portion on the base substrate, and at least partially overlaps an orthographic projection of the third portion on the base substrate.

6. The display substrate according to claim 4, wherein the display substrate further includes a power line; an orthographic projection of the power line on the base substrate at least partially overlaps the orthographic projection of the second electrode of the first transistor on the base substrate; the orthographic projection of the power line on the base substrate at least partially overlaps the orthographic projection of the second electrode of the second transistor on the base substrate.

7. The display substrate according to the claim 6, wherein, there is a first overlapping area between the orthographic projection of the shielding pattern on the base substrate and the orthographic projection of the power line on the base substrate, the shielding pattern is coupled to the power line through a first via hole in the first overlapping area;

an orthographic projection of the first via hole on the base substrate is located between orthographic projections of gate electrode of first transistors in adjacent sub-pixel driving circuits along the second direction on the base substrate.

8. The display substrate according to claim 4, wherein, the first transistor includes a first active layer, and the first active layer includes two first channel portions, and a conductor portion coupled to the two first channel portions respectively;

the orthographic projection of the shielding pattern on the base substrate at least partially overlaps an orthographic projection of a conductor portion in an adjacent sub-pixel driving circuit on the base substrate.

9. The display substrate according to the claim 8, wherein the shielding pattern includes a first shielding portion and a second shielding portion, and the first shielding portion includes at least part extending along the first direction, the second shielding portion includes at least part extending along the second direction;

an orthographic projection of the first shielding portion on the base substrate at least partially overlaps the orthographic projection of the second electrode of the first transistor on the base substrate, and also at least partially overlaps the orthographic projection of the second electrode of the second transistor on the base substrate; an orthographic projection of the second shielding portion on the base substrate at least partially overlaps the orthographic projections of the conductor portion in the adjacent sub-pixel driving circuit on the base substrate.

10. The display substrate according to the claim 9, wherein, at least part of the orthographic projection of the first shielding portion on the base substrate is located between the orthographic projection of the first end portion on the base substrate and an orthographic projections of the first electrode of the fourth transistor on the base substrate.

11. The display substrate according to the claim 10, wherein at least part of the first electrode of the fourth transistor and the first end portion are arranged along the second direction.

12. The display substrate according to claim 10, wherein at least part of the power line extends along the first direction; the power line includes a first sub-portion and a second sub-portion, a width of the first sub-portion is smaller than a width of the second sub-portion in a direction vertical to the first direction;

at least part of an orthographic projection of the first sub-portion on the base substrate is located between the orthographic projection of the first end portion on the base substrate and the orthographic projection of the first electrode of the fourth transistor on the base substrate.

13. The display substrate according to the claim 12, wherein the sub-pixel driving circuit further includes a third conductive connection portion, and the third conductive connection portion is respectively coupled to the first electrode of the fourth transistor and the corresponding data line; the third conductive connection portion and the first sub-portion are arranged along the second direction.

14. The display substrate according to claim 6, wherein the sub-pixel driving circuit further includes a storage capacitor, and the gate electrode of the driving transistor is reused as a first electrode plate of the storage capacitor, a second electrode plate of the storage capacitor is coupled to the power line; the second electrode plate of the storage capacitor and the shielding pattern are arranged at a same layer and made of a same material.

15. The display substrate according to claim 1, wherein the display substrate further includes a plurality of gate lines to provide control signals for the first transistor and the fourth transistor in the sub-pixel;

a minimum distance between an overlapping area between the gate line and the first conductive connection portion in a direction perpendicular to the base substrate and an overlapping area between the gate line and the data line in the direction perpendicular to the base substrate is A, and a maximum length of the first conductive connection portion in an extending direction of the data line is B, a ratio of A to B ranges from 0.3 to 0.6.

16. The display substrate according to claim 1, wherein the plurality of sub-pixels are divided into a plurality of pixel units, each pixel unit includes a first sub-pixel, a second sub-pixel and a third sub-pixel; the first sub-pixel includes a first anode pattern, the second sub-pixel includes a second anode pattern, and the third sub-pixel includes a third anode pattern; the first anode pattern and the second anode pattern are located in a same column along the first direction, and the third anode pattern is located in another column.

17. A display device comprising the display substrate according to claim 1.

* * * * *